(12) United States Patent
Haber et al.

(10) Patent No.: US 10,244,854 B1
(45) Date of Patent: Apr. 2, 2019

(54) GRIPPING APPARATUS FOR HANDHELD DEVICES

(71) Applicant: Tzumi Electronics LLC, New York, NY (US)

(72) Inventors: Shimon Haber, Brooklyn, NY (US); Joseph Castelli, New York, NY (US); Lawrence T. Levine, Easton, CT (US); Noam Elharar, New York, NY (US)

(73) Assignee: Tzumi Electronics LLC, New York, NY (US)

( * ) Notice: Subject to any disclaimer, the term of this patent is extended or adjusted under 35 U.S.C. 154(b) by 0 days.

(21) Appl. No.: 15/958,746

(22) Filed: Apr. 20, 2018

Related U.S. Application Data

(60) Provisional application No. 62/616,772, filed on Jan. 12, 2018.

(51) Int. Cl.
B65G 7/12 (2006.01)
A45F 5/10 (2006.01)

(52) U.S. Cl.
CPC .......... A45F 5/10 (2013.01); A45F 2005/108 (2013.01); A45F 2005/1013 (2013.01); A45F 2200/0516 (2013.01)

(58) Field of Classification Search
CPC ........................................................ A45F 5/10
USPC ........................ 294/25; 361/679.59; 224/217
See application file for complete search history.

(56) References Cited

U.S. PATENT DOCUMENTS

| 7,661,567 | B2 | 2/2010 | Myers |
| 8,560,031 | B2 | 10/2013 | Barnett et al. |
| 8,737,066 | B1 | 5/2014 | Block |
| 8,844,098 | B2 | 9/2014 | Karmatz |
| 9,179,565 | B2 | 11/2015 | Cho |
| 9,647,714 | B2 | 5/2017 | Hirsch |
| 2005/0118858 | A1* | 6/2005 | Matsui ...................... H01R 4/64 439/410 |
| 2007/0181620 | A1* | 8/2007 | Carver, III ........... A44C 9/0053 224/217 |

(Continued)

FOREIGN PATENT DOCUMENTS

JP  2013 165470 A  8/2013

OTHER PUBLICATIONS

HandL. "HandL Grip Case for IPhone 6 Plus." *Gadget Flow*, Jul. 4, 2016, www.thegadgetflow.com/portfolio/handl-grip-case-iphone-6-plus/.

*Primary Examiner* — Paul T Chin

(74) *Attorney, Agent, or Firm* — Pearl Cohen Zedek Latzer Baratz LLP

(57) ABSTRACT

An apparatus for assisting a user in gripping a portable electronic device has a base element adapted to be attached to the portable electronic device, wherein the base element has a top surface with an attachment region and a bottom surface configured to mount the base element onto the portable electronic device; a gripping element, wherein the gripping element has a bottom surface with an attachment region; and a stretchable cord connecting the base element and the gripping element at the respective attachment regions thereof; wherein the attachment regions of the base element and of the gripping element have respective corresponding engaging elements that cooperate with one another to permit the base element and the gripping element to be secured against or engaged with one another.

30 Claims, 17 Drawing Sheets

(56) References Cited

U.S. PATENT DOCUMENTS

| | | | |
|---|---|---|---|
| 2008/0083797 A1* | 4/2008 | Myers | A45C 13/20 224/217 |
| 2012/0118770 A1* | 5/2012 | Valls | F16M 11/10 206/320 |
| 2016/0069512 A1 | 3/2016 | Grieve | |
| 2017/0195000 A1 | 7/2017 | Srour | |

* cited by examiner

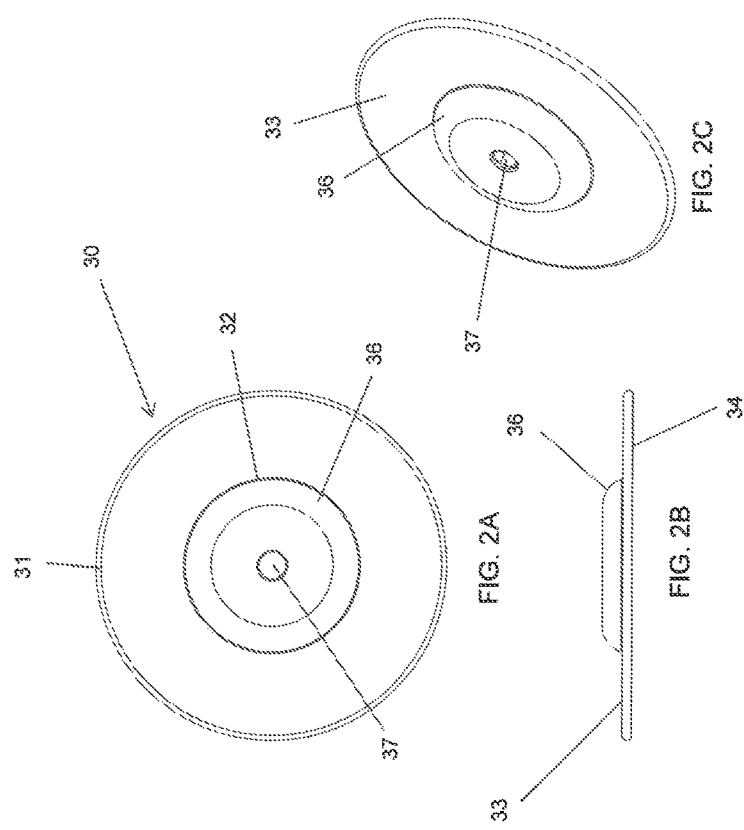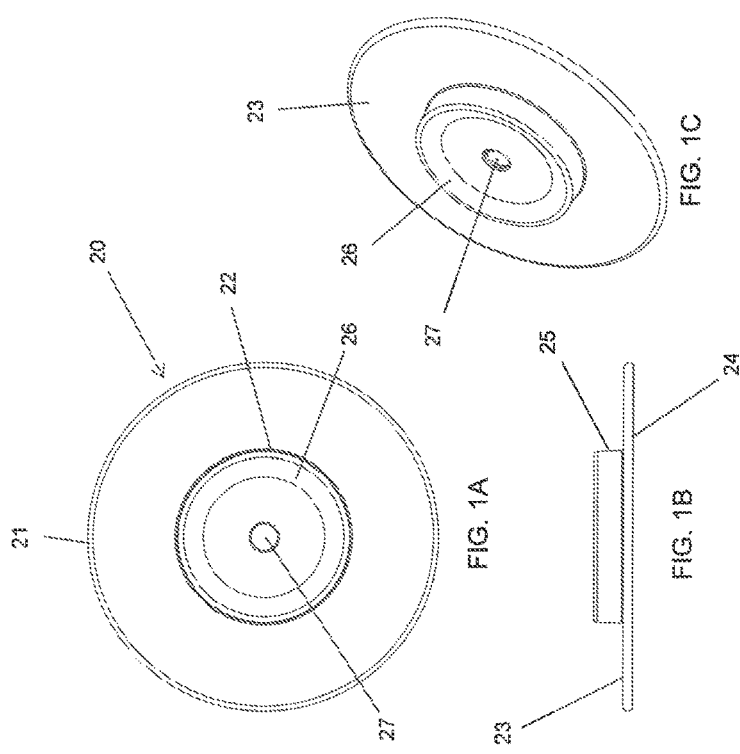

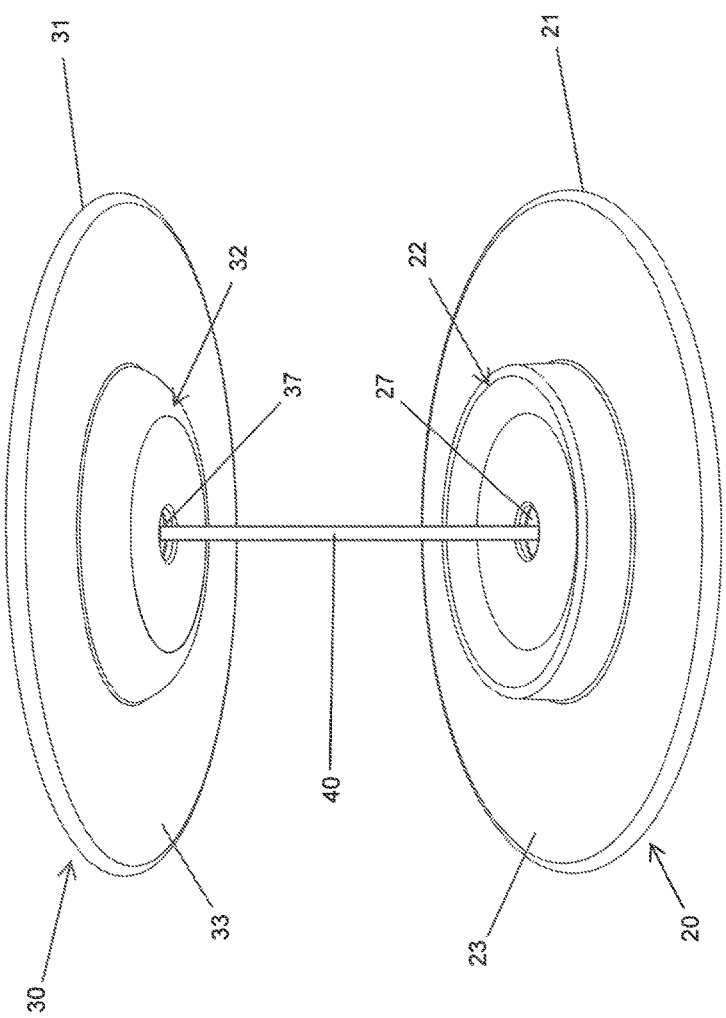

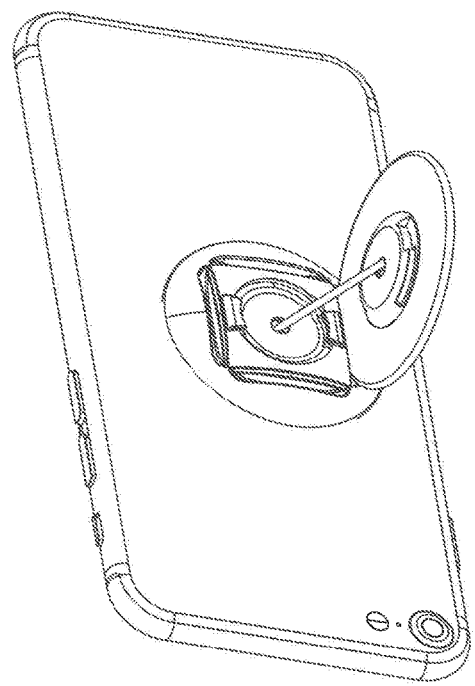
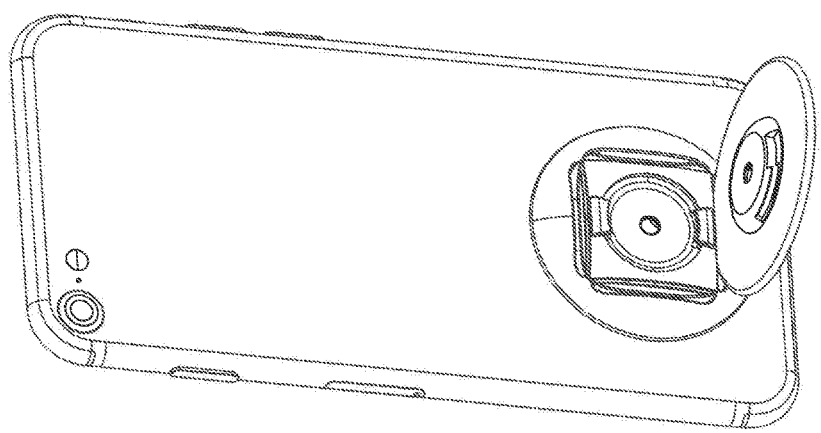

GRIPPING APPARATUS FOR HANDHELD DEVICES

CROSS-REFERENCE TO RELATED APPLICATIONS

This application claims the benefit of U.S. Provisional Patent Application No. 62/616,772, filed Jan. 12, 2018, the contents of which is incorporated by reference herein in its entirety.

FIELD OF THE INVENTION

The present invention relates to a gripping apparatus, and more particularly to an apparatus for gripping a handheld device with just two fingers so that the hand-held device is manually secured more effectively than mere hand gripping pressure.

BACKGROUND OF THE INVENTION

The use of handheld electronic computing devices, such as smartphones, is prevalent in today's society, to the extent that users often grip their smartphones while performing other tasks. In general, the typically-rectangular shape of such devices allows a user to securely grip such a device with a one hand while accessing the device's touch screen with the other hand. However, the rectangular shape of such devices may create difficulty when the user desires to access the device's touch screen with the same hand that the user is using to grip the device or when performing other tasks. Similarly, if a user is moving about and holding the portable computing device in one hand, it can be unwieldy to manipulate and rotate the portable computing device, particularly while attempting to perform other tasks at the same time.

This difficulty presents a risk that the user may fumble the device, lose control of it and drop it, and often results in users damaging their devices. Therefore, a user may not easily operate such a handheld device with one hand, even when securely gripping the device with the fingers.

Accordingly, there is a need for an apparatus for enabling a user to securely and comfortably hold such portable electronic devices with a single hand while allowing greater range of movement of the user's fingers while holding the device.

Some apparatus that allow portable or handheld electronic devices to be held securely by one hand of a user currently exist in the marketplace.

For example, U.S. Pat. No. 7,661,567 to Myers describes a button with an adhesive flat back surface for attachment to a hand-held device and a leash extending from the button and terminating with a finger ring to be secured onto the hand of the user. The ring may be an extension of the leash, both a part of an elastic cord loop where the leash is secured within the button and the ring extends away from the button, and the leash may be retractable.

U.S. Pat. No. 8,844,098 to Karmatz describes a base to be affixed to a first surface of the handheld device, at least one extension extending from the base at a first end of the extension, and a grip extending from the at least one extension at a second end of the extension, wherein the grip is oriented substantially parallel to the first surface of the handheld device, and wherein the apparatus is adapted to receive a portion of at least one finger inserted between the grip and the handheld device.

U.S. Pat. No. 8,737,066 to Block describes a gripping device having a base element adapted to be attached to the portable electronic device, a gripping element shaped to be gripped by the user, and a flexible cord connected to the base element and to the gripping element, to be inserted between two of the user's fingers. The gripping device enables the user to hold the portable electronic device via the gripping device using just two fingers.

U.S. Pat. No. 8,560,031 to Barnett et al. describes extending sockets, formed of an accordion with buttons attached at the distal ends, for attaching to a portable media player for protection of the player, managing a headset, attaching to belts, forming stand legs to prop the player at a desired angle, forming grips for gaming, forming grips for securely holding and manipulating player with one hand, and forming extended legs for wedging players that are phones between the ear and shoulder.

U.S. Pat. No. 9,179,565 to Cho describes a portable electronic device holder having a base plate having an adhesive pad to be attached to a rear surface of the portable electronic device; a ring to be placed on a finger of a user, and a connector is provided with the ring and fitted into a coupling hole of the base plate so that the holder is integrally coupled to a rear surface of the base plate.

U.S. Pat. No. 9,647,714 to Hirsch describes a flexible member that, at one end, extends through a hole in the back portion of the mobile device's case and is anchored to an interior surface of the back portion of the case and, at the other end, is coupled to a finger brace that is configured to brace a user's finger on each of its two opposed sides. The flexible member's length is such that two fingers of the user's hand can press against the finger brace to brace the mobile device when the two fingers are between the finger brace and the case.

U.S. Patent Application Publication No. 2016/0069512 to Grieve describes a device having a base plate to be mounted on and rotatable relative to a portable computing device, at least one finger support member, and at least one spacer element connected to the finger support member and to the base plate; wherein the finger support member is moveable between a closed position in which the finger support member is substantially flush with the base plate and an open position in which the finger support member is spaced from the base plate such that a user can insert at least one finger between the base plate and the finger support member.

U.S. Patent Application Publication No. 2017/0195000 to Srour describes two circular discs that are somewhat rotatable with respect to one another and are connected by a foldable cover that houses a spring that, when collapsed, pushes the discs away from each other while the foldable cover is semi-flexible. When the accessory is collapsed, the foldable cover folds over itself, whereas when the accessory is expanded, the foldable cover becomes unfolded with a smaller-circumference center ridge which is less flexible or non-flexible, and situated between two larger circumference areas. Flanges on the inner and outer rings abut each other, keeping the spring collapsed and discs locked into each other in some embodiments. When the rings are rotated with respect to one another, the flanges become unlocked and the spring separates the discs such that one or both of the foldable cover or spring become the limiting factor in how far apart the discs spread from another.

However, none of such arrangements solves all the needs of such an apparatus.

It is desirable to provide a gripping apparatus that is able to securely grip the user's fingers between the apparatus and the handheld electronic device and allow the user's fingers to comfortably fit around the gripping apparatus.

It is also desirable to provide a gripping apparatus that is able to allow the tightness of the apparatus's grip to be adjusted automatically, such as based upon the thickness of the user's fingers or the space between them, and not manually.

It is further desirable to provide a gripping apparatus into which a user can insert his/her fingers and grip the handheld electronic device with one hand.

It is still further desirable to provide a gripping apparatus that is able to be deployed when in use and to be closed and secured to the handheld electronic device, such as being locked, i.e., where the upper and lower elements are engaged with each other or secured into a low profile, when not in use.

It is even further desirable to provide a gripping apparatus that can be used as a variable-angle stand for angled display of the handheld electronic device when not being held by the user.

It is yet even further desirable to provide a gripping apparatus that can help mount the handheld electronic device to a support apparatus, such as a magnetic holder.

There is a continued need to address at least some of the issues mentioned above.

SUMMARY OF THE INVENTION

In accordance with these and other objects of the invention, the invention is directed to a device or apparatus for assisting a user in gripping a portable electronic device.

In one embodiment, the apparatus has a base element adapted to be attached to the portable electronic device, wherein the base element has a top surface with an attachment region and a bottom surface configured to mount the base element onto the portable electronic device; a gripping element, wherein the gripping element has a bottom surface with an attachment region; and a stretchable cord connecting the base element and the gripping element at the respective attachment regions thereof; wherein the attachment regions of the base element and of the gripping element have respective corresponding engaging elements that cooperate with one another to permit the base element and the gripping element to be secured against or engaged with one another.

In another embodiment, an apparatus for assisting a user in gripping a portable electronic device comprises a base element adapted to be attached to the portable electronic device, wherein the base element has a top surface with an attachment region and a bottom surface configured to mount the base element onto the portable electronic device; a gripping element, wherein the gripping element has a bottom surface with an attachment region; and a stretchable cord connecting the base element and the gripping element at the respective attachment regions thereof, wherein the stretchable cord is sufficiently elastic to allow the gripping element to be extended away from the base element a sufficient distance for a user to insert one or more fingers between the gripping element and the base element, to grip the user's fingers when they are inserted between the gripping element and the base element, and to snap back against the base element when the user's fingers are removed; whereby the stretchable cord is sufficiently elastic to allow the gripping element to automatically adjust a tightness of its grip to a thickness of the user's fingers when they are inserted between the gripping element and the base element; wherein the attachment regions of the base element and of the gripping element have respective corresponding engaging elements that cooperate with one another to permit the base element and the gripping element to be secured against or engaged with one another when the user's fingers are removed from between the gripping element and the base element.

In some embodiments, the bottom surface of the base element has an adhesive layer thereon for securely mounting the base element to the portable electronic device.

In some embodiments, the gripping element has a top surface and includes a cover layer that is attached to the top surface of the gripping element. In some embodiments, the cover layer includes decorative indicia printed thereon.

In some embodiments, the gripping element may be at partially formed from a material that can be magnetically attracted to a car mount that is magnetized.

In some embodiments, the attachment regions of the base element and of the gripping element have respective corresponding contours that cooperate with one another to permit the gripping element to be angled relative to the base element so that the user's fingers may be inserted between the gripping element and the base element.

For example, in some such embodiments, the attachment region of the base element has a concave shape and the attachment region of the gripping element has a convex shape, whereby, by cooperation of the respective attachment regions, the gripping element is configured to be fit into the base element and is configured to be angled relative to the base element when the gripping element is pushed down or lifted upwards at an edge thereof.

For example, in other such embodiments, the attachment region of the base element has a convex shape and the attachment region of the gripping element has a concave shape, whereby, by cooperation of the respective attachment regions, the gripping element is configured to be fit onto the base element and is configured to be angled relative to the base element when the gripping element is pushed down or lifted upwards at one edge thereof.

In certain embodiments, the engaging elements comprise a first magnetic element on the attachment region of the gripping element and a second magnetic element on the attachment region of the base element, wherein the gripping element may be secured against or engaged with the base element by cooperation of the first and second magnetic elements when the gripping element is placed against the base element.

In certain embodiments, the engaging elements comprise one or more protrusions on the attachment region of one of the gripping element or the base element and one or more indentations on the attachment region of the other of the gripping element or the base element, wherein the gripping element may be secured against or engaged with the base element by insertion of the one or more protrusions into the one or more indentations when the gripping element is placed against the base element. In some of these embodiments, the one or more protrusions fit tightly into the one or more indentations.

In certain embodiments, the engaging elements comprise a raised or an indented circular gear-shaped section on the attachment region of one of the gripping element or the base element and a plurality of projections on the attachment region of the other of the gripping element or the base element, wherein, if the circular gear-shaped section is raised, the circular gear-shaped section has a plurality of circumferential teeth therearound with a gap between each two of the plurality of teeth, and wherein each of the plurality of projections is shaped to fit within a gap; wherein, if the circular gear-shaped section is indented, the circular gear-shaped section has a plurality of circumferential tooth slots therearound with a peak between each two of the plurality of tooth slots, and wherein each of the plurality of projections is shaped to fit within a tooth slot; and wherein the gripping element may be secured against or engaged with the base element by insertion of the one or more projections into one or more respective gaps or one or more respective tooth slots when the gripping element is placed against the base element.

In some such embodiments, the one or more projections fit tightly into the one or more respective gaps or into the one or more respective tooth slots. In some of these embodiments, the gripping element may be secured against or engaged with the base element in any rotational position relative thereto.

In certain embodiments, the engaging elements comprise one or more arcuate slots on the attachment region of one of the gripping element or the base element and one or more projections on the attachment region of the other of the gripping element or the base element, wherein the gripping element may be secured against or engaged with the base element by insertion of the one or more projections into the one or more arcuate slots and by subsequent rotation of the gripping element relative to the base element.

In some such embodiments, at least one of the one or more arcuate slots has a bump or lip at a position therein such that at least one of the one or more projections passes thereover after insertion of the one or more projections into the one or more arcuate slots and subsequent rotation of the gripping element relative to the base element, such that, during rotation of the gripping element relative to the base element, a user securing the gripping element against or engaging it with the base element feels that the gripping element has been secured against or engaged with the base element.

In certain embodiments, the engaging elements comprise a grommet in the attachment region of one of the gripping element or the base element and an opening around the stretchable cord in the attachment region of the other of the gripping element or the base element, wherein the grommet may be secured within the opening by insertion of the grommet into the opening around the stretchable cord when the gripping element is placed against the base element.

In certain embodiments, the gripping element has a planar shape with at least one edge, and the top surface of the base element comprises at least one recess that is configured to accept the edge of the gripping element, such that the gripping element may be mounted at an angle against the base element.

In some such embodiments, the apparatus may be formed into a stand for the portable electronic device by insertion of the edge of the gripping element into one of the at least one recess such that the gripping element is mounted at an angle against the base element, thereby forming a stand.

In some such embodiments, the top surface of the base element comprises at least two recesses located at different positions thereon, so as to provide at least two different types of stands for the portable electronic device when the gripping element is mounted at an angle against the base element.

In another embodiment, an apparatus for assisting a user in gripping a portable electronic device comprises a base element, wherein the base element has a planar body having a top surface with an attachment region that has a first contour in at least a portion thereof and having a bottom surface configured to attach the base element onto the portable electronic device, the base element having one or more first engaging elements; a gripping element, wherein the gripping element has a bottom surface with an attachment region that has a second contour in at least a portion thereof, the gripping element having one or more second engaging elements; and a stretchable cord connecting the base element and the gripping element at the respective attachment regions thereof that is sufficiently elastic to allow the gripping element to be extended away from the base element a sufficient distance for a user to insert one or more fingers between the gripping element and the base element, whereby the stretchable cord grips the user's fingers when they are inserted between the gripping element and the base element and snaps the gripping element back against the base element when the user's fingers are removed, and whereby the stretchable cord allows the gripping element to automatically adjust a tightness of its grip to a thickness of the user's fingers when they are inserted between the gripping element and the base element; wherein the first contour of the attachment region of the gripping element is configured to cooperate with the second contour of the attachment region of the base element when the stretchable cord pulls the gripping element against of the base element, thereby allowing the gripping element to be angled relative to the base element when the gripping element is pushed down or lifted upwards at an edge thereof so that the user's fingers may be inserted between the gripping element and the base element, and wherein the one or more first engaging elements and the one or more second engaging elements cooperate to permit the base element and the gripping element to be engaged with each other.

In certain embodiments, the one or more first engaging elements comprises at least one first magnetic element and the one or more second engaging elements comprises at least one second magnetic element that cooperates with the at least one first magnetic element, wherein the gripping element may be engaged with the base element by cooperation of the at least one first magnetic element and the at least one second magnetic element when the gripping element is placed against the base element.

In certain embodiments, one of the one or more first engaging elements or of the one or more second engaging elements comprises at least one arcuate slot and the other of the one or more first engaging elements or of the one or more second engaging elements comprises at least one projection that cooperates with the at least one arcuate slot, whereby the gripping element may be engaged with the base element by insertion of the at least one projection into the at least one arcuate slot and by subsequent rotation of the gripping element relative to the base element.

In some such embodiments, the at least one arcuate slot has a bump or lip at a position therein such that the at least one projection passes thereover after insertion of the at least one projection into the at least one arcuate slot and subsequent rotation of the gripping element relative to the base element, such that, during rotation of the gripping element relative to the base element, a user securing the gripping element against or engaging it with the base element feels that the gripping element has been secured against or engaged with the base element.

In certain embodiments, one of the one or more first engaging elements or of the one or more second engaging elements comprises at least one protrusion and the other of the one or more first engaging elements or of the one or more second engaging elements comprises at least one indentation that cooperates with the at least one protrusion, wherein the gripping element may be secured against or engaged with the base element by insertion of the at least one protrusion into the at least one indentation when the gripping element is placed against the base element.

In some such embodiments, the at least one protrusion fits tightly into the at least one indentation.

In certain embodiments, one of the one or more first engaging elements or of the one or more second engaging elements comprises a raised or an indented circular gear-shaped section and the other of the one or more first engaging elements or of the one or more second engaging elements comprises at least one projection, wherein, if the circular gear-shaped section is raised, the circular gear-shaped section has a plurality of circumferential teeth therearound with a gap between each two of the plurality of teeth, and wherein each of the at least one projection is shaped to fit within a gap; wherein, if the circular gear-shaped section is indented, the circular gear-shaped section has a plurality of circumferential tooth slots therearound with a peak between each two of the plurality of tooth slots, and wherein each of the at least one projection is shaped to fit within a tooth slot; and wherein the gripping element may be secured against or engaged with the base element by insertion of the at least one projection into at least one respective gap or at least one respective tooth slot when the gripping element is placed against the base element.

In certain embodiments, one of the one or more first engaging elements or of the one or more second engaging elements comprises a grommet in the attachment region and the other of the one or more first engaging elements or of the one or more second engaging elements comprises an opening around the stretchable cord in the attachment region, wherein the grommet may be secured within the opening by insertion of the grommet into the opening around the stretchable cord when the gripping element is placed against the base element.

In certain embodiments, the gripping element has a planar shape, and the top surface of the base element comprises at least one recess that is configured to accept the edge of the gripping element, such that the gripping element may be mounted at an angle against the base element.

In some such embodiments, the apparatus may be formed into a stand for the portable electronic device by insertion of the edge of the gripping element into one of the at least one recess of the base element, such that the gripping element is mounted at an angle against the base element, thereby forming a stand.

In some such embodiments, the top surface of the base element comprises at least two recesses located at different positions thereon, so as to provide at least two different types of stands for the portable electronic device when the gripping element is mounted at an angle against the base element.

BRIEF DESCRIPTION OF THE DRAWINGS

In order for the present invention to be better understood and for its practical applications to be appreciated, the following figures are provided and referenced hereafter. It should be noted that the Figures are given as examples only and in no way limit the scope of the invention. Like components are denoted by like reference numerals.

FIGS. 1A, 1B and 1C schematically illustrate plan, side and perspective views, respectively, of a base element of a first embodiment of the gripping apparatus.

FIGS. 2A, 2B and 2C schematically illustrate plan, side and perspective views, respectively, of an upper element of the first embodiment of the gripping apparatus.

FIG. 3 is schematically illustrates a perspective view of the first embodiment of the gripping apparatus with the upper and base elements in a spaced apart, open position;

FIGS. 17A, 17B, 17C and 17D schematically illustrate perspective views of a handheld electronic device with various orientations of an attached second embodiment of the gripping apparatus whose upper and base elements are mounted in an angled configuration.

Figure 4:
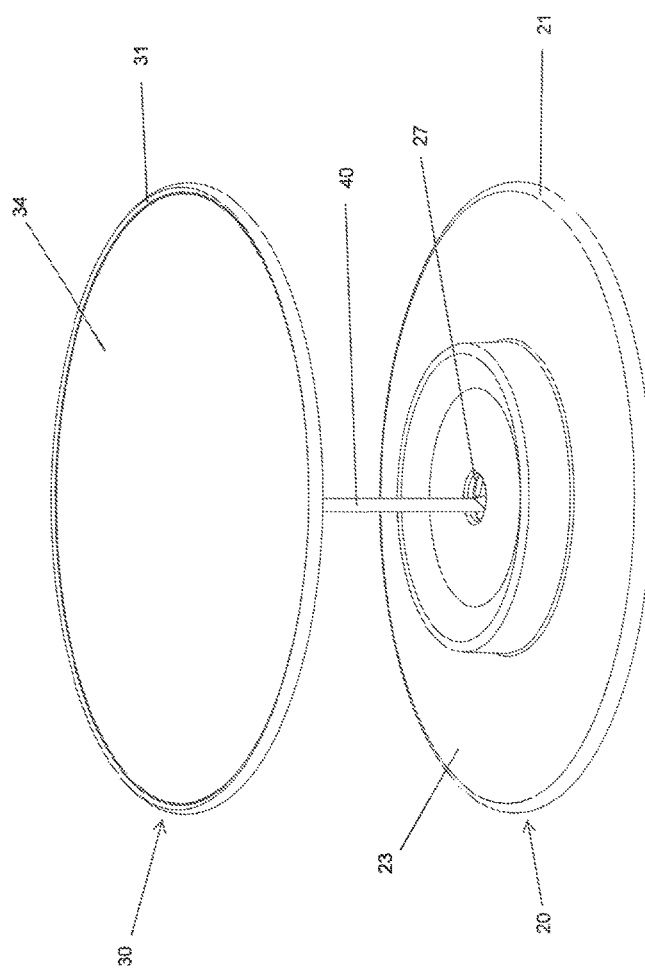
FIG. 4 schematically illustrates a perspective view of the first embodiment of the gripping apparatus with the upper and base elements in a spaced apart position.

It should be noted that the embodiments depicted are shown only schematically, and that not all features may be shown in full detail or in proper proportion. Certain features or structures may be exaggerated relative to others for clarity. It should be noted further that the embodiments shown are examples only and should not be construed as limiting the scope of the present disclosure or appended claims.

DETAILED DESCRIPTION OF THE INVENTION

In the following detailed description, various embodiments of the present invention will be described with reference to the accompanying drawings, and numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a description of known functions and configurations incorporated herein will be omitted when it may make the subject matter of the present invention rather unclear.

In the following description, orientation of physical objects has been described with terms such as "top", "back", "front" and "back". The terms are not specific to the particular orientation described and are not to be construed as limiting with respect to the direction or orientation of the physical objects described, but may be used to refer to any sides or faces of the physical objects, as long as the orientation described is consistently referred to.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Unless otherwise indicated, the conjunction "or" as used herein is to be understood as inclusive (any or all of the stated options).

FIGS. 1-14D are diagrams illustrating embodiments of an apparatus for gripping a handheld electronic device according to the present invention.

In accordance with a first embodiment of the present invention, a gripping apparatus has two opposing portions that are elastically connected to one another. A base element is configured to be attached to the handheld electronic device that is to be gripped, and an upper element is elastically connected to the base portion by a connecting member. When the upper element is pulled away from the base element, a user's fingers are placed in the space between the upper and base elements, preferably around the connecting member, and then the upper element is allowed to be pulled back towards the base element via the elastic connecting member, whereby the user's fingers are held therebetween, such that the user may securely grip the handheld electronic device securely and comfortably.

As illustrated schematically in FIGS. 1A, 1B and 1C, which are plan, side and perspective views, respectively, a first embodiment of the gripping apparatus has a base element 20. Base element 20 has a flange element 21 that has a generally planar body with a front surface 23 and a back surface 24, and also has a central mounting region 22. In certain embodiments, central mounting region 22 of base element 20 projects from front surface 23 and may include an outer wall 25 and a sloped inner wall 26 that combine to form a concave structure. Central mounting region 22 of base element 20 may further include a receiving hole 27.

Base element 20 is adapted or configured to be attached to a handheld electronic device whose gripping by a user is desired. In this regard, back surface 24 of flange element 21 of base element 20 may include an adhesive layer (not shown) for bonding base element 20 onto the portable electronic device. Alternative to an adhesive, base element 20 may be attached to or integrally formed with a protective frame (not illustrated) or a skin (not illustrated), such as is already common in the art, for attaching base element 20 onto the portable electronic device. Those skilled in the art may devise alternative methods of attaching or otherwise associating base element 20 with the portable electronic device, and such alternatives should be considered within the scope of the present invention.

As illustrated schematically in FIGS. 2A, 2B and 2C, which are plan, side and perspective views, respectively, a first embodiment of the gripping apparatus has an upper element 30. Upper element 30 also has a flange element 31 that has a generally planar body with a front surface 33 and a back surface 34, and also has a central mounting region 32. In certain embodiments, central mounting region 32 of upper element 30 projects from front surface 33 and may include a sloped wall 36 that forms a convex structure. Central mounting region 32 of upper element 30 may further include a receiving hole 37.

For consistency of reference herein, front surface 33 of flange element 31 of upper element 30 is intended to face towards front surface 23 of flange element 21 of base element 20 when upper element 30 and base element 20 are assembled in the gripping apparatus, as shown in FIG. 3.

In one embodiment, as shown in FIGS. 1A-C and 2A-C, both flange element 21 of base element 20 and flange element 31 of upper element 30 may have a generally round or disk shape. However, this shape may alternatively be a wide variety of shapes or designs, such as square, rounded square, rectangular, triangular, oval, elliptical, hour-glass, figure-8, etc. The shape can be formed as an ornament or specialty shape, such as to assist marketing campaigns; such shapes can depict an object, animal, or company logo, for example. Alternatively, ornamental designs can be added to the shape with markings or engraving. Furthermore, flange element 21 of base element 20 and flange element 31 of upper element 30 may have the same shape as one another or may not have the same shape as one another.

Base element 20 and upper element 30 may be made of any appropriate material (or combination of materials) so as to accomplish the purposes described herein. Thus, in one embodiment, it is preferred that base element 20 and upper element 30 be made of a material that is rigid and that is resilient enough to counterbalance the force applied by the user's fingers with relatively little change in shape. For example, in one embodiment, base element 20 and upper element 30 may be made from a solid, lightweight material, such as plastic, carbon fiber, or metal, for example, Polypropylene or ABS Plastic, and may be opaque, translucent or transparent. Other materials may be used.

Base element 20 is adapted or configured to support the fingers of a user once it is attached to a portable electronic device, and upper element 30 is intended to grip the fingers user on the opposite sides thereof from base element 20. In this regard, front surface 23 of flange element 21 of base element 20 and back surface 34 of flange element 31 of upper element 30 may include elements that promote this gripping relationship. For example, front surface 23 of flange element 21 of base element 20 and front surface 33 of flange element 31 of upper element 30 can be scalloped or fluted when viewed in profile, and such contours can be pre-molded, or the surfaces can comprise a material that is moldable to the user's fingers so that it would provide a customizable fit.

In addition, front surface 23 of flange element 21 of base element 20 and front surface 33 of flange element 31 of upper element 30 may be textured to increase friction, i.e., be stippled or grooved, so as to create a larger frictional force against the user's fingers and aid in effectiveness of the gripping device, or coated with a material that is soft to the touch or provides padding for the user's fingers (e.g., foam, cloth, leather, or rubber). Texturing or padding can allow a better grip without as much slippage.

As mentioned, and as shown in FIGS. 1A-C and 2A-C, each of flange element 21 of base element 20 and flange element 31 of upper element 30 has a generally flat or planar body. Alternatively, flange elements 21 and 31 may have a wide variety of shapes or designs, so long as a user's fingers can comfortably fit between them. Furthermore, flange elements 21 and 31 can be moldable from a flat or planar shape into a shape preferred by the user. In such an embodiment, flange elements 21 and 31 can include a core made of a rigid but malleable material (e.g., a soft metal like aluminum) that can be bent by the user when sufficient force is applied but that remains rigid when used as part of a gripping apparatus for holding a mobile device.

In some embodiments, the contours of front surface 23 of flange element 21 of base element 20 and of front surface 33 of flange element 31 of upper element 30 can be shaped and sized to match the contours of the user's fingers for the comfort of the user and for effectiveness and efficiency of the gripping apparatus. For example, it is desirable that the diameter of flange element 21 of base element 20 be wide enough to provide sufficient support for base element 20 when attached to the handheld mobile device. Similarly, it is desirable that the diameter of flange element 31 of upper element 30 be wide enough to provide sufficient gripping support for the user's fingers so as to prevent the fingers from slipping out of the gripping apparatus when in use. In certain embodiments, the diameter can be from 0.25" to 3", more particularly from 1" to 2". In some embodiments, the diameter of flange element 21 of base element 20 can be smaller than the diameter of flange element 31 of upper element 30, while in other embodiments, the diameter of flange element 21 of base element 20 can be larger than the diameter of flange element 31 of upper element 30.

In the present embodiment, FIG. 3 schematically illustrates upper element 30 and base element 20 of the gripping apparatus in a spaced apart, open relationship, in which upper element 30 and base element 20 are interconnected by one or more connecting member 40.

As shown in FIGS. 3 and 4, connecting member 40 is attached at one end to base element 20 by passing into receiving hole 27. In certain embodiments, receiving hole 27 may be positioned at substantially a central point on base element 20, although in other embodiments it need not be so positioned.

Figure 5:
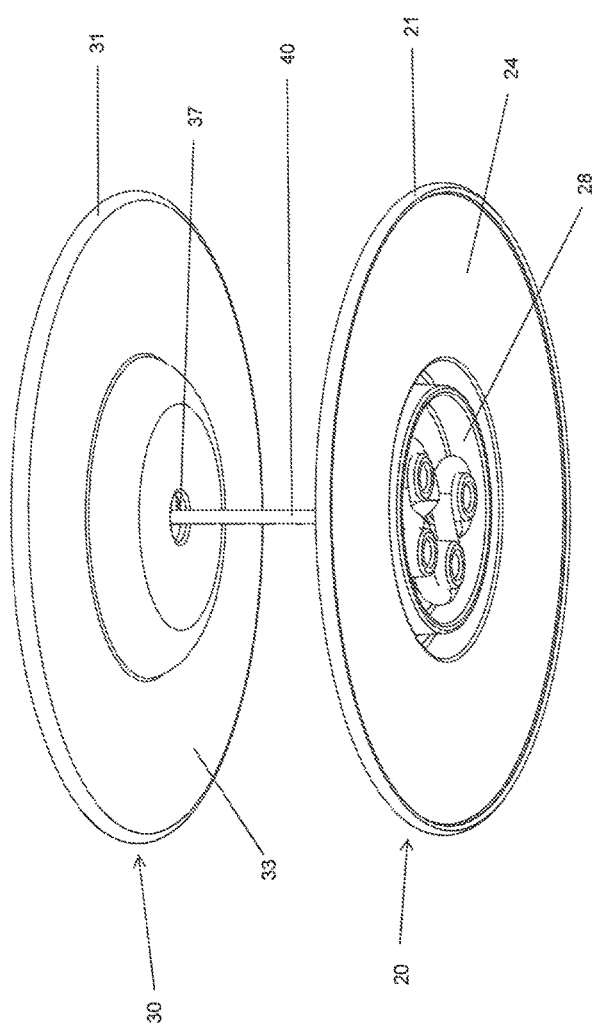
FIG. 5 schematically illustrates a perspective view of the first embodiment of the gripping apparatus with the upper and base elements in a spaced apart position.
Figure 6:
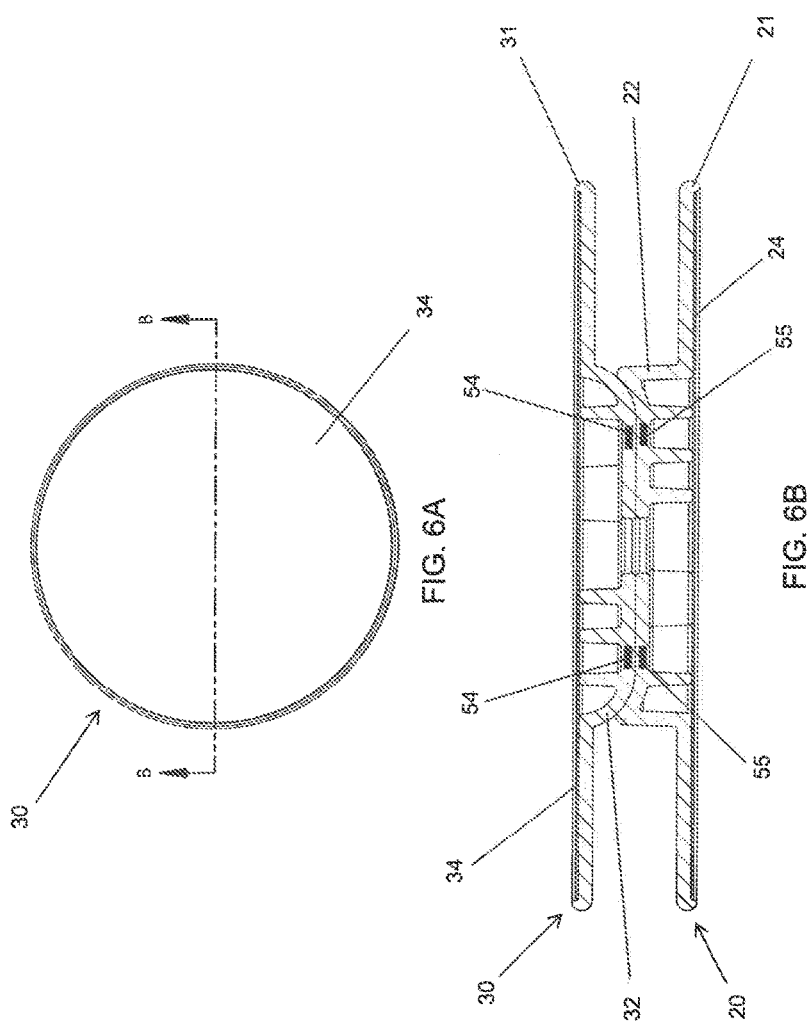
FIGS. 6A and 6B schematically illustrate a plan view and a cross sectional view, respectively, of the first embodiment of the gripping apparatus with the upper and base elements in a fully retracted position.

Similarly, as shown in FIGS. 3 and 5, connecting member 40 is attached at its other end to upper element 30 by passing into receiving hole 37. In certain embodiments, receiving hole 37 may be positioned at substantially a central point on upper element 30, although in other embodiments it need not be so positioned.

In preferred embodiments, connecting member 40 should preferably be elastic or automatically retracting when upper element 30 is pulled away from base element 20. In certain embodiments, connecting member 40 is generally in a tensed or stretched position, even when upper element 30 and base element 20 are not in use and are held close together, so as to hold upper element 30 and base element 20 against each other.

In certain embodiments, connecting member 40 is sufficiently resilient so as to be stretched further when upper element 30 and base element 20 are pulled apart, as shown in FIG. 3. The limit of elasticity of connecting member 40 is the limiting factor in how far apart upper element 30 and base element 20 may be spread from one another. Connecting member 40 is sufficiently elastically resilient so as to enable flange elements 21 and 31 to retract against a user's fingers when the fingers are placed between upper element 30 and base element 20, thereby providing a more secure grip to the user and facilitating use of the gripping apparatus. In preferred embodiments, when upper element 30 retracts towards base element 20 against the user's fingers, connecting element 40 allows the tightness of the gripping apparatus around the user's fingers to be adjusted automatically, such as based upon the elasticity of connecting member 40 as well as the thickness of the user's fingers or the space between them, and not manually by an external force.

In certain embodiments, connecting member 40 may be formed wholly of elastic, such as rubber, silicone, bungee/stretch cord, or the like. In certain other embodiments, connecting member 40 may formed of an elastic core surrounded by a smooth, relatively inelastic surface that causes less friction or irritation to the user's fingers. In certain other embodiments, connecting member 40 may be formed of a smooth, elastic outer tube surrounding a relatively inelastic core member that serves as a limit to the elastic stretch of the outer tube, to prevent it from being stretched too far, e.g., past its elastic limit, for example a silicone rubber tubing around a PTFE (Teflon®) filament. In some embodiments, connecting member 40 may have a thickness of ⅛, 1/16 or 1/32 inch, depending upon the strength of material used. Those skilled in the art may devise or know of suitable elastic materials or thicknesses for connecting member 40, and such alternatives should be considered within the scope of the present invention. The tension of such connecting member 40 can be adjusted as desired.

The specific means of attachments of connecting member 40 within receiving hole 27 and within receiving hole 37 may be one of several known means in the art, including by being anchored via an attachment device, such as a staple, by being clamped within a narrow space, or by being tied around a post or loop. For example, FIG. 5 shows in a bottom perspective view a non-limiting example of a means of attachment of connecting member 40 within receiving hole 27 of base member 20. As seen in FIG. 5, connecting member 40, after passing through receiving hole 27 in base member 20, exits from the underside thereof into an exit recess 28 in the back surface 24 of base member 20. In certain embodiments, connecting member 40 may be mounted within exit recess 28 in a manner so as to avoid fracture points in connecting member 40, e.g., being wound repeatedly.

Those skilled in the art may devise or know of alternative attachment means that function as described herein to enable connecting member 40 to be attached to base element 20 and upper element 30, and such alternatives should be considered within the scope of the present invention. In addition, the specific means of attachment of connecting member 40 within receiving hole 27 and exit recess 28 may be the same or different from the specific means of attachment of connecting member 40 within receiving hole 37 and exit recess 38.

Figure 9:
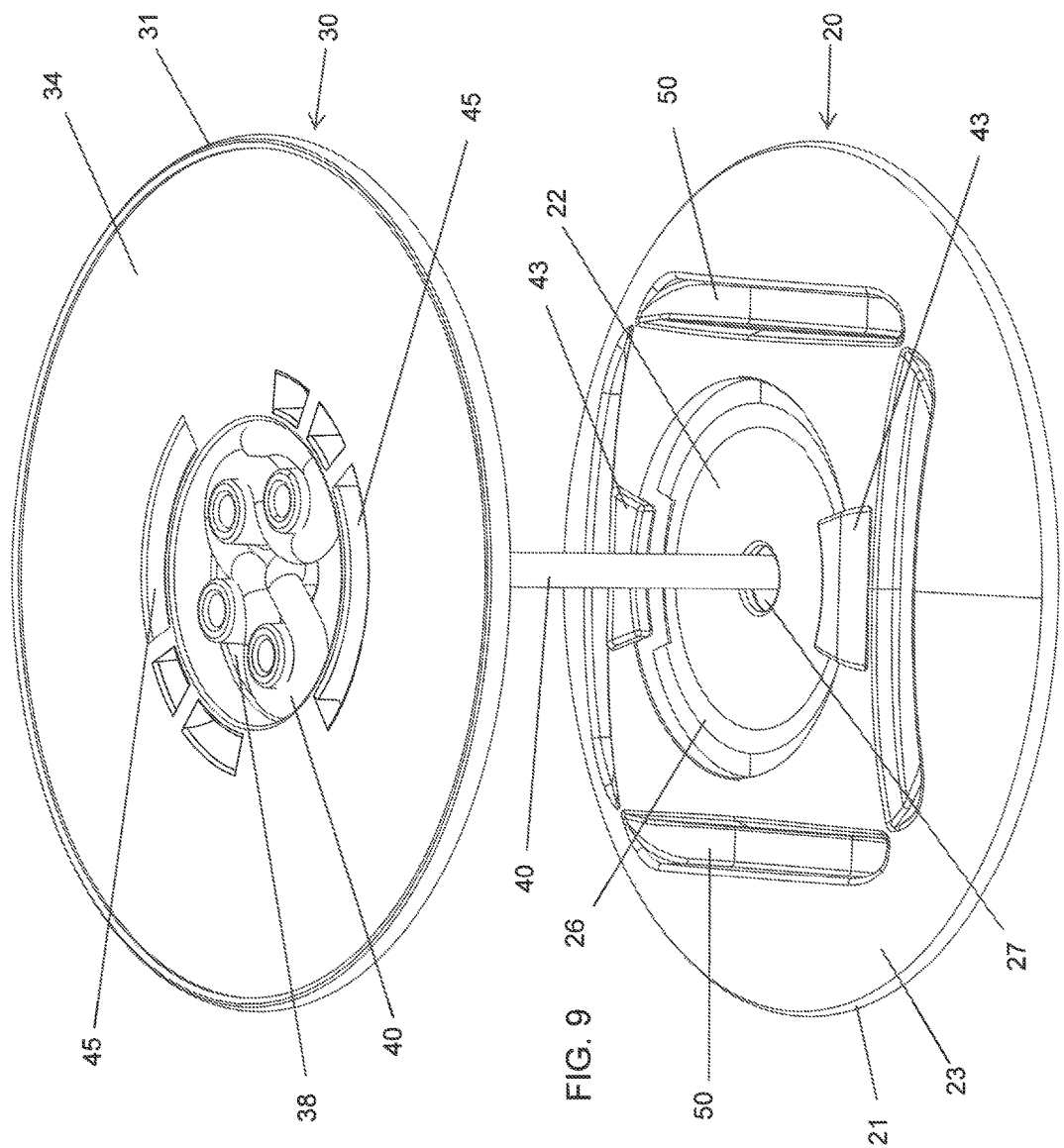
FIG. 9 schematically illustrates a perspective view of a second embodiment of the gripping apparatus with the upper and base elements in a spaced apart retracted position.

In many embodiments, a cover layer may be adhered, bonded or otherwise, to back surface 34 of upper element 30 so as to cover an exit recess 38 of receiving hole 37. FIG. 9 shows back surface 34 of upper element 30 wherein exit recess 38 of receiving hole 37 can be seen in an uncovered state, and FIG. 4 shows back surface 34 of upper element 30 wherein exit recess 38 of receiving hole 37 cannot be seen, as it has been covered by a cover layer. The cover layer may also form a decorative cover, which may bear printed indicia and may be interchangeable and customized as desired. In some embodiments, the cover layer is transparent to protect decorative indicia, which may be printed on either front surface 33 of upper element 30 or an underside of the cover layer.

In certain embodiments, a portion or layer of upper element 30, such as the cover layer on back surface 34 of upper element 30, or back surface 34 itself of upper element 30, is magnetized or is formed (in whole or in part) of metal, a magnet or a ferromagnetic material, to allow gripping apparatus, when not in use by being held by a user, to be magnetically adhered or attracted to a support apparatus, such as a car mount, that is metal or magnetized, has a magnetic attraction, or incorporates a magnet or a ferromagnetic material. As used herein, "magnet" can mean any material that has attractive properties to a similarly attractive material. In this embodiment, the metal, magnetized, magnetically attractive or ferromagnetic upper element 30 of the gripping apparatus, which is adhered to the back of the handheld electronic device, is used to connect the handheld electronic device to the support apparatus, such as car mount, that is similarly (or oppositely) formed (in whole or in part) of a metal, is magnetized or magnetically attractive, or incorporates a magnet or a ferromagnetic material.

A cover layer may also be used on back surface 24 of base element 20 so as to cover exit recess 28 of receiving hole 27 wherein connecting element 40 is attached. On the other hand, in general, no such cover is needed, as back surface 24 of base element 20 is generally adhered directly to a portable electronic device and thus is not seen by a user when the gripping apparatus is in use.

FIG. 6A shows the first embodiment of the gripping apparatus in a top, plan view, wherein only upper element 30 can be seen, with only back surface 34 thereof being visible. (A cover layer (not identified) is to be adhered to back surface 34 of upper element 30, covering exit recess 38 of receiving hole 37.) FIG. 6B shows the first embodiment of the gripping apparatus in a cross-sectional view taken along line B-B of FIG. 6A. As illustrated in FIG. 6B, when in its retracted position, connecting member 40 is still under some tension and pulls upper element 30 flush against base element 20, which is generally adhered to the handheld electronic device, so that, when not in use, the gripping apparatus has a low, flat profile that does not unduly protrude and interfere with transport and/or storage of the portable electronic device.

In certain embodiments, when connecting member 40 is in its retracted but still tensed position, upper element 30 and base element 20 form a nesting configuration. For example, in one embodiment, as shown in cross-section in FIG. 6B, the convex contour of central mounting region 32 of upper element 30 nests within the concave contour of central mounting region 22 of base element 20. In such a nesting configuration, upper element 30 and base element 20 can swivel with respect to one another to allow upper element 30 to be tipped with respect to base element 20.

Alternatively, although this is not shown, in another embodiment, it is central mounting region 32 of upper element 30 that has a concave contour, and it is central mounting region 22 of base element 20 that has a convex contour, such that the concave contour of central mounting region 32 of upper element 30 sits around the convex contour of central mounting region 22 of base element 20, whereby the convex contour of central mounting region 22 of base element 20 nests within the concave contour of central mounting region 32 of upper element 30.

Figure 7:
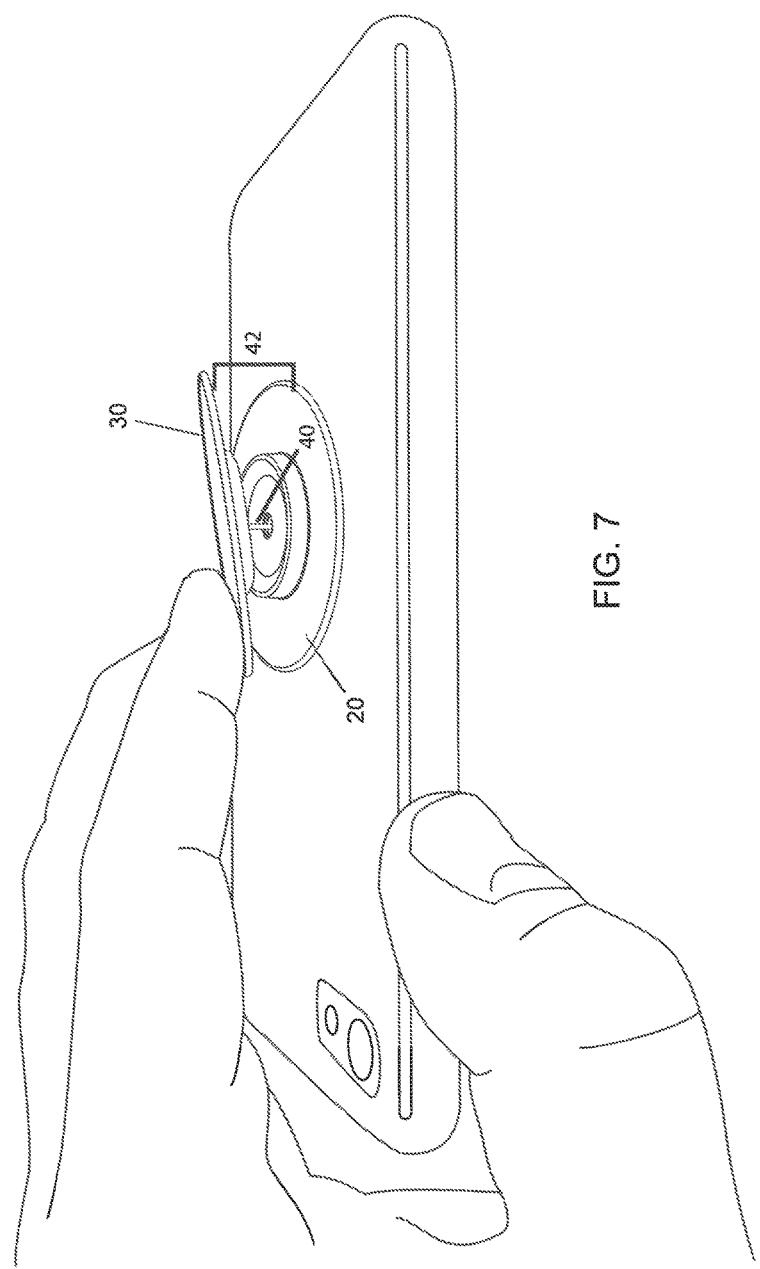
FIG. 7 schematically illustrates a user pressing on one edge of the upper element of the first embodiment of the gripping apparatus.

As shown in FIG. 7, when base element 20 is adhered to a handheld electronic device, pressing by a user on one edge of upper element 30 will cause upper element 30 to tip towards the edge where pressure was applied, while connecting member 40 maintains an elastic connection to base element 20, thereby opening up a gap 42. Thus, FIG. 7 shows a two-handed operation, wherein the user presses downward on one edge of upper element 30 with a first hand, allowing the user to insert the fingers of his/her other hand into gap 42 formed when the opposite edge of upper element 30 tips upwards. Alternatively, in a one-handed operation, the user can open gap 42 by using the edges of the fingers of one hand to push upward on the edge of upper element 30 and then sliding the fingers of the same hand into gap 42 on that same edge of upper element 30.

Figure 8:
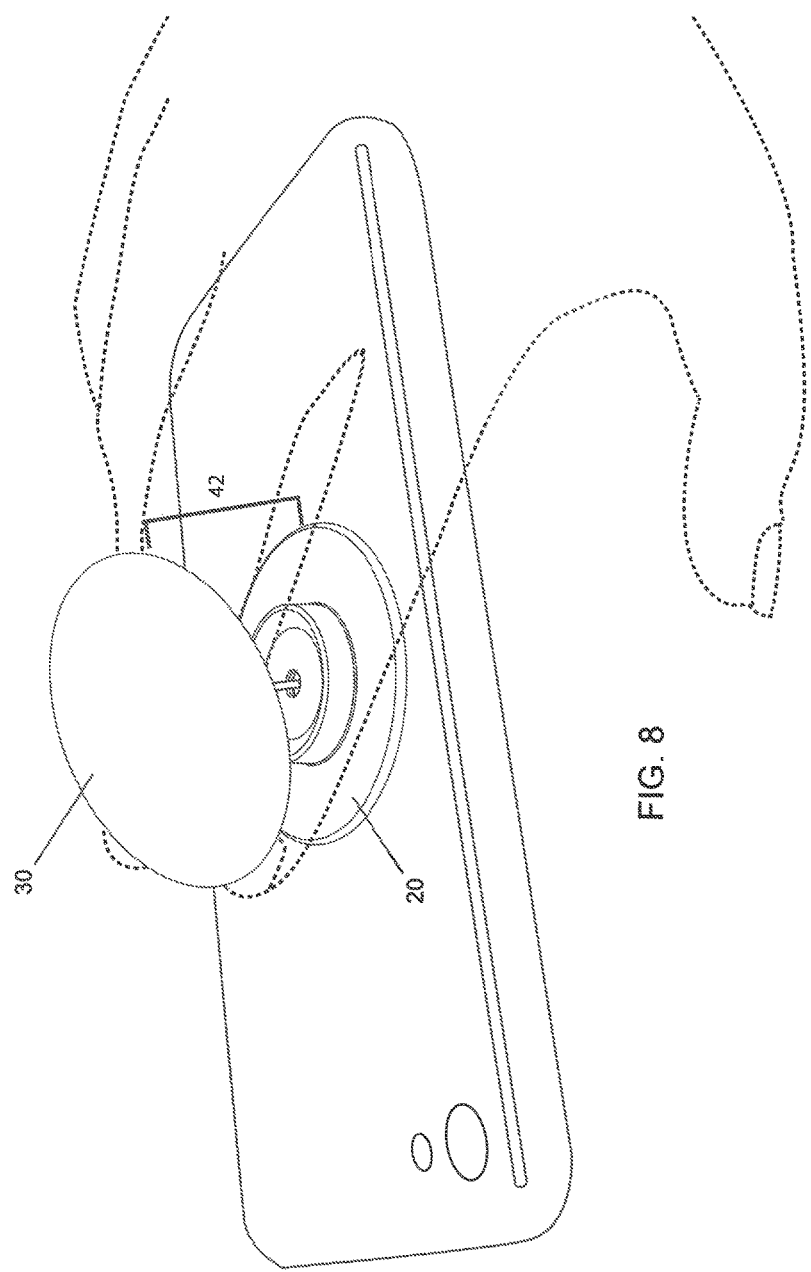
FIG. 8 schematically illustrates a user having inserted his or her fingers between the upper and base elements of the first embodiment of the gripping apparatus.

As illustrated in FIG. 8, gap 42 between upper element 30 and base element 20 should preferably be sufficiently large for the user to insert his or her fingers thereinto, for example with one finger on either side of the connecting member 40. Then, stretching pressure on connecting member 40 is released, flange elements 21 and 31 are allowed to retract against the user's fingers between upper element 30 and base element 20, thereby providing for a secure grip by the user when gripping the portable electronic device. It should be noted that the size of gap 42 that is needed for each user may vary depending upon the size of the user's fingers, thus enabling the gripping apparatus to be customized to all users, regardless of size or age.

Thus, FIG. 8 shows the first embodiment of the gripping apparatus in use. As shown, at least two fingers of one hand of the user are placed between base element 20 and upper element 30 on either side of connecting member 40, thereby leaving the user's thumb free to operate the portable electronic device to which the gripping apparatus is adhered, while leaving his or her other hand free to attend to other tasks. It should also be noted that the user's fingers are comfortably placed around connecting member 40, which, because it is narrow, can be conveniently held between two fingers.

As mentioned above, in certain embodiments, when not in use, the gripping apparatus can be set in a retracted position, in which upper element 30 is pulled flush against base element 20, as shown in FIG. 6B, so that the gripping apparatus has a low, flat profile against the portable electronic device. In certain alternative embodiments, in addition to upper element 30 forming a nesting configuration against base element 20, upper element 30 can be engaged with, held tightly to, or secured against base element 20. In certain embodiments, the gripping apparatus has features that allow this secured configuration to take place.

For example, in certain embodiments, upper element 30 can be made to engage with or fit tightly against or securely against base element 20 using cooperating magnets or ferromagnetic materials. For example, as shown in FIG. 6B, upper element 30 can be fitted with internal magnets 54 and base element 20 can be fitted with cooperating internal magnets 55, wherein magnets 54 and 55 are mutually attractive (one is N, while the other is S), such that, when the gripping apparatus is in a retracted position, upper element 30 fits tightly against, engages with or is secured, against base element 20 via magnets 54 and 55. Magnets 54 and 55 can be point magnets at specific opposite locations on base element 20 and upper element 30, can be longer magnets at specific opposite locations on base element 20 and upper element 30, or can be circular magnets that are set within base element 20 and upper element 30, e.g., within central mounting region 22 of base element 20 and central mounting region 32 of upper element 30. Magnets 54 and 55 can have any other suitable configuration such that upper element 30 is secured against base element 20 using cooperating magnets 54 and 55.

In an alternative configuration, upper element 30, either in its entirety or portions thereof, such as flange element 31 or central mounting region 32, can be made of a metallic or magnetic material 54, and base element 20 can be fitted with cooperating internal magnets 55, as discussed above, wherein the materials of magnets 54 and 55 are magnetically attractive to each other. In this configuration, when the gripping apparatus is in a retracted position, upper element 30 fits tightly, or is secured, against base element 20 via magnet 54, such as the material of flange element 31 or of central mounting region 32, and magnet 55.

As used herein, "magnet" can mean any material that has attractive properties to a similarly attractive material, such as any material that in whole or in part incorporates magnets, magnetically attractive or a ferromagnetic material.

Other alternative embodiments for engaging upper element 30 with base element 20 are described hereinbelow.

Figure 10:
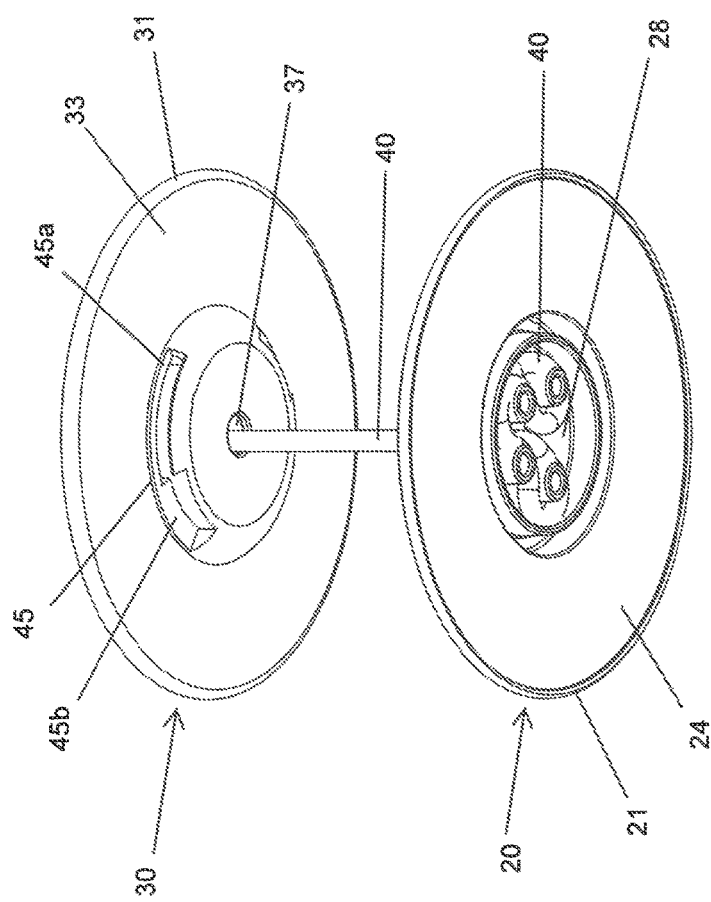
FIG. 10 schematically illustrates another perspective view of the second embodiment of the gripping apparatus with the upper and base elements in a spaced apart retracted position.

In a further embodiment, FIGS. 9 and 10 show perspective views of a second embodiment of the gripping apparatus, with the upper and base elements 30, 20 in a spaced apart position. FIG. 9 shows the second embodiment as viewed in perspective from under the base element 20, and FIG. 10 shows the second embodiment as viewed in perspective from above the upper element 30. As illustrated, the same elements that appear in the second embodiment that are in the first embodiment are designated by the same reference numerals, although they are shown in different embodiments. As shown in FIGS. 9 and 10, the second embodiment of the gripping apparatus, has many similarities to the first embodiment but also has certain differences therefrom.

For example, as shown in FIGS. 9 and 10, connecting member 40 is attached at one end to base element 20 by passing into receiving hole 27 and at the other end to upper element 30 by passing into receiving hole 37. A non-limiting example of a specific means of attachment of connecting member 40 of the second embodiment of the gripping apparatus within receiving holes 27 and 37 can be seen shown within exit recesses 28 and 38 of receiving holes 27 and 37 on back surfaces 24 and 34 of flanges 21 and 31 of base member 20 and upper element 30, respectively, where the respective ends of connecting member 40 are attached. (Normally, the means of attachment of connecting member 40 within exit recesses 28 and 38 of base member 20 and upper element 30, respectively, would not be seen by a user, as a cover layer may be adhered, bonded or otherwise, to back surface 34 of upper element 30 such that back surface 34 of upper element 30 is not seen, and back surface 24 of base element 20 is generally adhered directly to a portable electronic device such that back surface 24 of base element 20 is not seen, but these elements are shown here anyway for completeness.).

Figure 11:
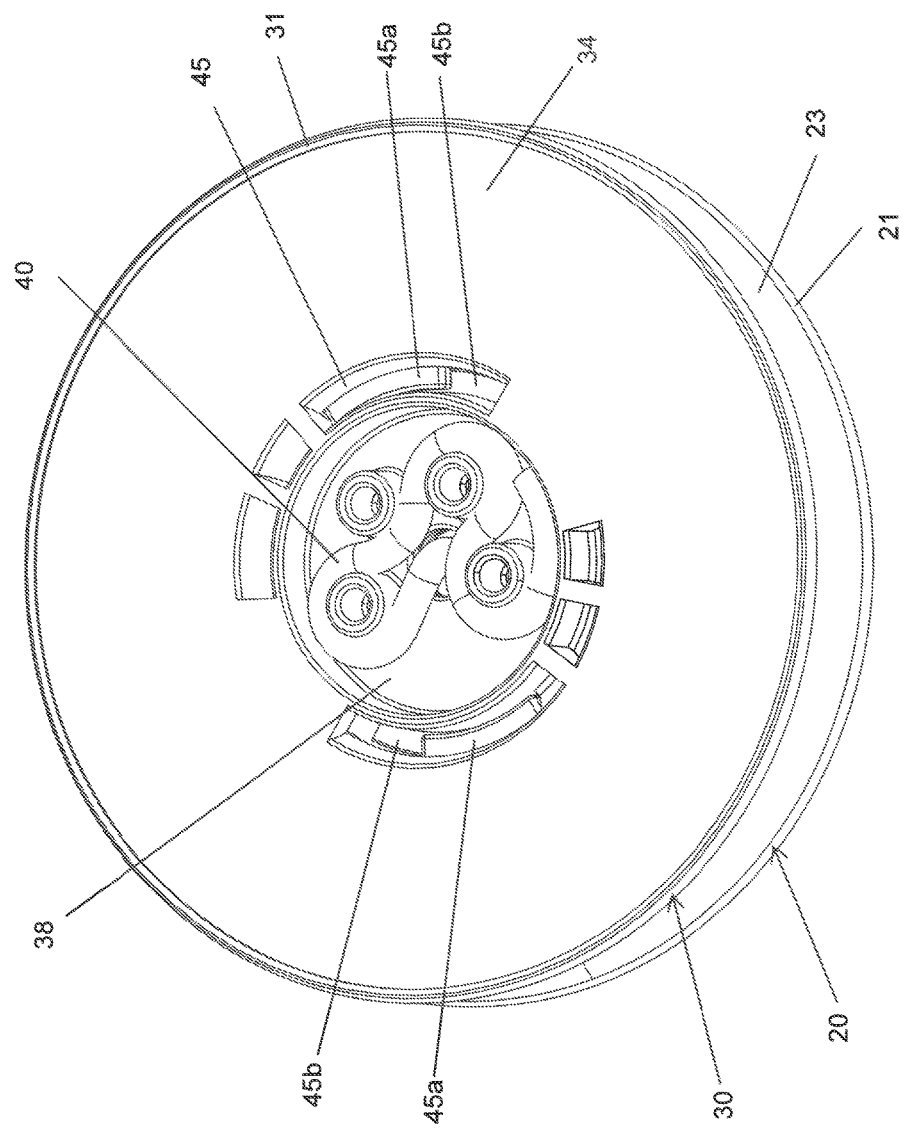
FIG. 11 schematically illustrates a perspective view of the second embodiment of the gripping apparatus with the upper and base elements in a fully retracted position.
Figure 12:
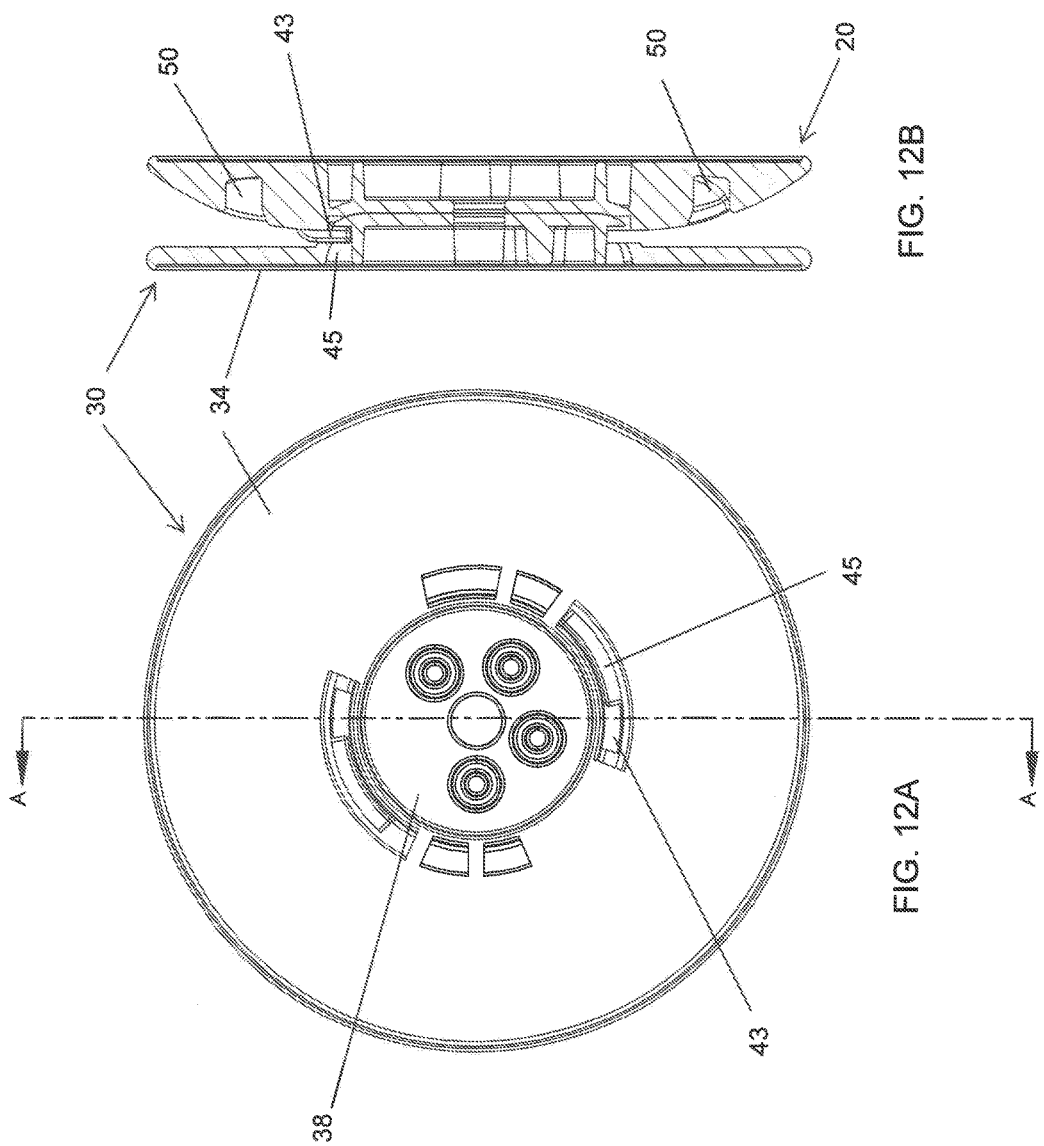
FIGS. 12A and 12B schematically illustrate a plan view and a cross sectional view, respectively, of the second embodiment of the gripping apparatus with the upper and base elements in a fully retracted and attached position.

FIG. 11 shows a perspective view of the second embodiment of the gripping apparatus, with upper element 30 in a fully retracted position against base element 20, and FIGS. 12A and 12B show plan and cross-sectional views, respectively, of the second embodiment with the upper and base elements in a fully retracted and engaged position. FIG. 12B shows a cross-sectional view of the second embodiment of the gripping apparatus taken along line A-A of the plan view shown in FIG. 12A.

As can be seen in FIGS. 9 and 10, and even better in FIG. 12B, the second embodiment of the gripping apparatus is different from the first embodiment in that, in the second embodiment, flange element 21 of base element 20 has a substantially planar body with a flat back surface 24 but with an arcuate front surface 23, such that base element 20 is thicker in its center portion that around it peripheral portion.

In addition, in the second embodiment of the gripping apparatus, central mounting region 22 of base element 20 has a concave structure but not one formed by the combination of an outer wall that projects from front surface 23 and a sloped inner wall, as in the first embodiment. Instead, the second embodiment has an indented concave structure formed from sloped inner wall 26 that dips downward and inward towards concave central mounting region 22, into the thicker central portion of base element 20. (FIG. 6C shows this second embodiment of the gripping apparatus with the upper 30 and base 20 elements in a spaced apart, open position.)

As in the first embodiment of the gripping apparatus, when connecting member 40 is in a retracted position, upper element 30 and base element 20 of the second embodiment of the gripping apparatus may form a nesting configuration. For example, as shown in cross-section in FIG. 12B, the convex contour of central mounting region 32 of upper element 30 nests within the concave contour of central mounting region 22 of base element 20. In such a nesting configuration of the second embodiment of the gripping apparatus, upper element 30 and base element 20 can swivel with respect to one another to allow upper element 30 to be tipped with respect to base element 20. Thus, by virtue of the swiveling of the convex contour of central mounting region 32 of upper element 30 within the concave contour of central mounting region 22 of base element 20, pressure by a user on one edge of upper element 30 will cause upper element 30 to tip towards the edge where pressure was applied, while connecting member 40 maintains an elastic connection to base element 20, thereby opening up a gap into which the user may insert the fingers of his/her hand, similar to the motion shown in FIG. 7 with respect to the first embodiment of the gripping apparatus.

In addition, as shown in FIGS. 9 and 10, in the second embodiment of the gripping apparatus, upper element 30 can be made to engage with or fit tightly or securely against base element 20 by way of one or more, in some embodiments three or four (or even more), projections 43 that project upward from the front surface 23 of flange element 21 of base element 20 that cooperate with a corresponding number of arcuate slots 45 formed into front surface 33 of flange element 31 of upper element 30.

In some embodiments, the gripping apparatus may have one or more, in some embodiments three or four (or more), projections 43 that project upward from the front surface 23 of flange element 21 about central mounting region 22 of base element 20. In other embodiments, projections 43 project inward from the front surface 23 of flange element 21 or from sloped inner wall 26, in both cases towards central mounting region 22 of base element 20. In certain embodiments, projections 43 may also have a somewhat upside-down L-shaped configuration, as shown in FIG. 12B, wherein each projection 43 is attached to front surface 23 of flange element 21 of base element 20 at a first, attached end, with the other, unattached end projecting inward towards the center of front surface 23 of flange element 21.

In addition, in some embodiments, the gripping apparatus may have one or more, in some embodiments three or four (or more), corresponding arcuate slots 45 formed into front surface 33 of flange element 31 of upper element 30. In other embodiments, arcuate slots 45 are formed into sloped wall 36 that forms a convex structure of central mounting region 32 on upper element 30. In certain embodiments, arcuate slots 45 are formed about central mounting region 32 of upper element 30. In certain embodiments, as shown in FIGS. 9, 11 and 12A, arcuate slots 45 are formed completely through front surface 33 of flange element 31 of upper element 30.

In certain embodiments, as shown best in FIGS. 10 and 11, each of arcuate slots 45 has a narrow opening 45a along most of its arcuate length but has a wider opening 45b at certain positions, such as one or two ends. Preferably, the wider opening 45b is wide enough to allow the unattached end of the L-shaped projection 43 to pass therethrough, and the narrow opening 45a is wide enough to allow the thickness of the attached end of the L-shaped projection 43 to be moved therealong but is too narrow to allow the unattached end of the L-shaped projection 43 to pass therethrough.

As shown in cross-section in FIG. 12B, in the second embodiment of the gripping apparatus, projections 43 and arcuate slots 45 may cooperate so as to lock or engage upper element 30 and base element 20 into each other. Specifically, when the gripping apparatus is in its fully retracted position such that upper element 30 and base element 20 form a nesting configuration in which the convex contour of central mounting region 32 of upper element 30 is nested within the concave contour of central mounting region 22 of base element 20, upper element 30 and base element 20 may be rotated or turned with respect to each other, such as in a counter-clockwise or clockwise direction, along the axis of connecting member 40, such that projections 43 on base element 20 are aligned with arcuate slots 45 in upper element 30. Specifically, the unattached ends of the L-shaped projections 43 are aligned with and are pressed into the wider openings 45b of arcuate slots 45. Then, while upper element 30 and base element 20 are pressed towards each other, the unattached ends of the L-shaped projections 43 pass into wider openings 45b of arcuate slots 45. Next, upper element 30 and base element 20 are then further rotated with respect to each other, such that the attached ends of the L-shaped projections 43 move along the arcuate lengths of the narrow openings 45a of arcuate slots 45 to positions wherein the unattached ends of the L-shaped projections 43 are unable to pass back through, whereby projections 43 on base element 20 are secured in and are engaged with arcuate slots 45 in upper element 30, thereby preventing an applied pulling force from being able to separate upper element 30 from base element 20.

Thus, projections 43 and arcuate slots 45 keep upper element 30 and base element 20 secured against, engaged with or locked into each other, wherein the gripping apparatus and connecting member 40 are in an engaged position. When upper element 30 is secured against, engaged with or locked into base element 20 by virtue of cooperation of projections 43 on base element 20 with arcuate slots 45 in upper element 30, upper element 30 is positioned flush against base element 20, which is attached to the portable electronic device, so that, when not in use, the gripping apparatus has a low, flat profile that does not unduly protrude and interfere with transport and/or storage of the portable electronic device.

In order to unlock or disengage upper element 30 from base element 20 in this embodiment, upper element 30 and base element 20 must first be rotated with respect to each other, such as in a counter-clockwise or clockwise direction (i.e., in the direction opposite to that used when engaging), such that the longer ends of the L-shaped projections 43 move along the arcuate length of the narrow opening 45a of arcuate slots 45 to positions wherein the shorter ends of the L-shaped projections 43 are aligned with wider openings 45b of arcuate slots 45, whereby L-shaped projections 43 may pass back out of wider openings 45b. Then, upper element 30 and base element 20 may be pulled away from each other, such that the shorter ends of the L-shaped projections 43 pass out of wider openings 45b of arcuate slots 45.

In addition, the inside surface of each of arcuate slots 45 in upper element 30 may have a small raised surface, such as a slight lip or bump, therein in order to assist the user in feeling or detecting when upper element 30 and base element 20 are secured against, engaged with or locked into each other and help secure projections 43 within arcuate slots 45. The lip or bump may be situated within each arcuate slot 45 at a position such that each projection 43 will have to pass thereover when being rotated into arcuate slot 45, for example at least partway into, or in some embodiments near or close to the end of, the arcuate lengths of the narrow openings 45a, thereby enabling a user to feel when projection 43 is fully rotated into arcuate slot 45. When L-shaped projections 43 are pressed into the wider openings 45b of arcuate slots 45 and then moved along the arcuate lengths of the narrow openings 45a of arcuate slots 45, the attached ends of the L-shaped projections 43 pass over the small raised surfaces. This slight disturbance in the movement of L-shaped projections 43 within arcuate slots 45 is felt by the user (e.g., as a "click"), and is understood by the user as an indication that L-shaped projections 43 have moved sufficiently far into arcuate slots 45 so as to enable upper element 30 to be engaged with base element 20, such that upper element 30 is fit tightly or securely against base element 20. The lip or bump may also be situated within each arcuate slot 45 at a position such that each projection 43 will also have to pass thereover when being rotated out of arcuate slot 45, thereby keeping upper element 30 from counter-rotating with respect to base element 20 by helping to secure projection 43 within arcuate slot 45. This small raised surface within arcuate slots 45 thereby also serves as a stopper against, or to prevent, backward motion of L-shaped projections 43 within arcuate slots 45, thereby keeping upper element 30 engaged with base element 20.

Alternatively, although this is not shown, in another version of this second embodiment, it is central mounting region 32 of upper element 30 that has a concave contour and projections 43 as described, and it is central mounting region 22 of base element 20 that has a convex contour and arcuate slots 45, such that the concave contour of central mounting region 32 of upper element 30 sits around the convex contour of central mounting region 22 of base element 20, whereby the convex contour of central mounting region 22 of base element 20 nests within and can be secured against, engaged with or locked into the concave contour of central mounting region 32 of upper element 30.

Figure 13:
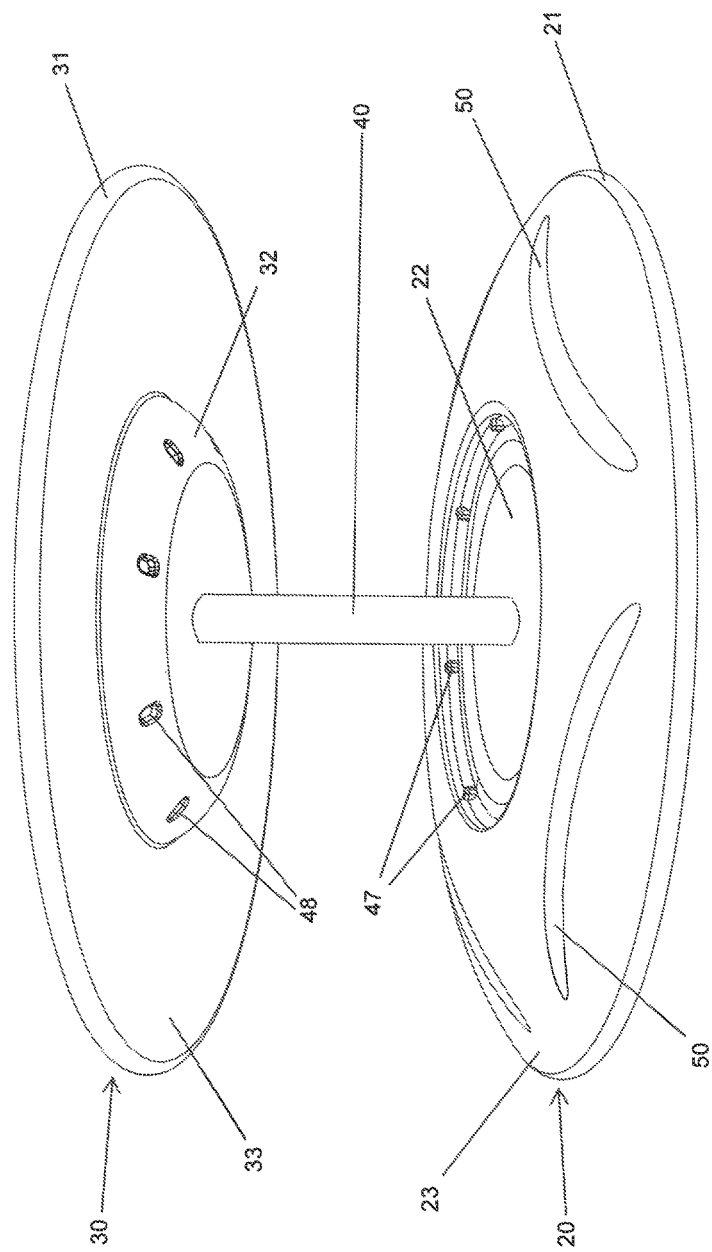
FIG. 13 schematically illustrates a perspective view of another configuration of the second embodiment of the gripping apparatus with the upper and base elements in a spaced apart, open position.

In another configuration of the gripping apparatus, as shown in FIG. 13, base element 20 and upper element 30 can be engage with or fit tightly against each other, such as by surface contours that are opposite in shape and fit tightly within each other, even more than the convex/concave contours that were discussed previously and shown in FIG. 6B. For example, as shown in FIG. 13, front surface 23 of base element 20 may have surface protrusions 47 and front surface 33 of upper element 30 may have cooperating surface indentations 48 that allow upper element 30 to rest flush against, and tightly fit against, base element 20. Alternatively, front surface 23 of base element 20 may have indentations and front surface 33 of upper element 30 may have cooperating protrusions, that allow upper element 30 to rest flush against, and tightly fit against, base element 20.

These surface protrusions 47 and their cooperating surface indentations 48 can be in the form of male/female elements whose tolerance is small so as to allow for a tight, frictional fit, thereby allowing upper element 30 to be fit tightly or be secured against base element 20. Alternatively, male/female protrusions 47 and surface indentations 48 may have a larger tolerance to allow for protrusions 47 to be loosely fit into surface indentations 48 as an alignment or locator fit. As shown in FIG. 13, base element 20 and upper element 30 may have any appropriate number of cooperating protrusions 47 and indentations 48, for example as few as one and as many as a multiplicity.

Alternatively, front surface 33 of upper element 30 may have surface protrusions 47, and front surface 23 of base element 20 may have cooperating surface indentations 48, that allow upper element 30 to engage with and tightly fit against base element 20.

Additionally, or alternatively, cooperating protrusions 47 and indentations 48 may also incorporate magnets to allow for a firmer fit between them. In one such embodiment, surface protrusions 47 may have magnets, e.g., a magnetically attractive or ferromagnetic material, such as magnets 55, such as on the tips of surface protrusions 47, and the inside surfaces of surface indentations 48 may have similar magnets, such as magnets 54, that cooperate with the magnets on surface protrusions 47. In another such embodiment, magnets can be located within attachment region 22 of base element 20 and in attachment region 32 of upper element 30, as described with regard to FIG. 6B.

In such an embodiment, upper element 30 of the gripping apparatus can be self-locating or self-adjusting against base element 20. When connecting member 40 draws upper element 30 towards base element 20 when the user's fingers are withdrawn, upper element 30 rests against base element 20. Protrusions 47 are aligned with indentations 48, and magnets 54/55, if present, attract, such that protrusions 47 are drawn to and rest inside indentations 48, with little effort by the user. If the tolerance between surface protrusions 47 and their cooperating surface indentations 48 is small so as to allow for a tight, frictional fit, a downward force should then be applied to upper element 30 in order to press surface protrusions 47 into cooperating surface indentations 48 in base element 20 so as to engage upper element 30 with base element 20. A force applied by the user's fingers being inserted between upper element 30 and base element 20 would free surface protrusions 47 from cooperating surface indentations 48.

The two configurations of the gripping apparatus discussed hereinabove that allow upper element 30 and base element 20 to engage with each other without requiring the use of magnets, as shown in FIGS. 9-12 and FIG. 13, both require the user to align upper element 30 with respect to base element 20 in order to engage them together, either to engage projections 43 within arcuate slots 45 for subsequent rotation or to engage surface protrusions 47 into surface indentations 48. However, there may be a desire to engage upper element 30 and base element 20 without requiring the user to precisely align upper element 30 against base element 20. In addition, while magnets may be incorporated (as in FIG. 6B) in order to draw and hold upper element 30 and base element 20 together, magnets may not provide sufficient force to hold upper element 30 and base element 20 together if they are accidentally loaded, such as when stored in a pocket or purse.

Figure 14:
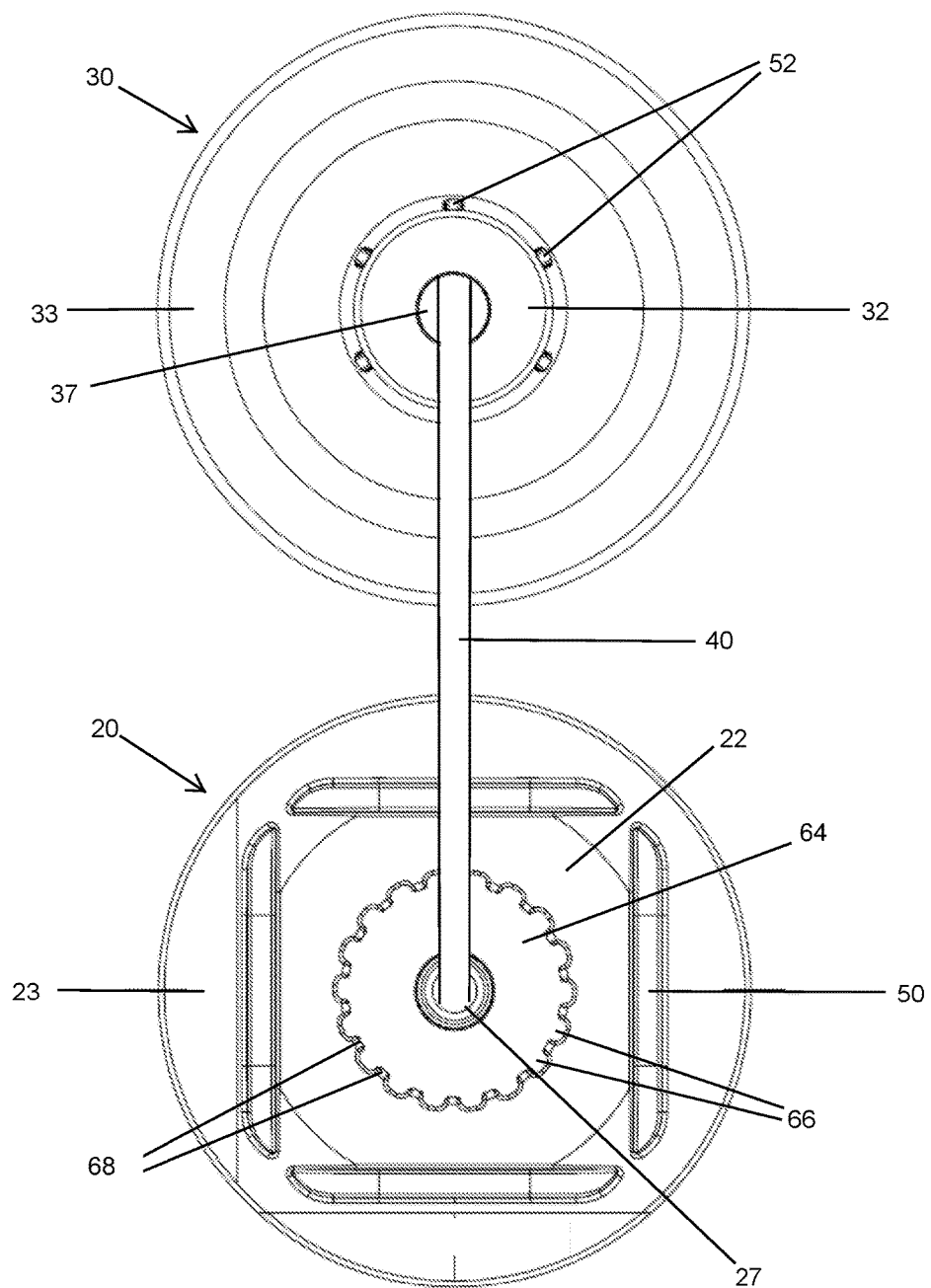
FIG. 14 schematically illustrates a plan view of an additional configuration of the second embodiment of the gripping apparatus with the upper and base elements in a spaced apart, open position.

One such example is shown in FIG. 14, wherein front surface 23 of base element 20 may have a concave or indented (e.g., inset) section 64 in the attachment region 22 thereof in the shape of an indented circular gear arranged around receiving hole 27. Normally, a circular gear would have a plurality of teeth therearound with gaps between them, but the indented gear-shaped concave section 64 shown in FIG. 14 has a plurality of slots 66 where gear teeth would be and a corresponding of plurality of peaks 68 between them where the gaps between gear teeth would be. The front surface 33 of upper element 30 may have a plurality of cooperating surface nodes, ribs or projections 52 in the attachment region 32 thereof positioned around receiving hole 37 that cooperate with slots 66 of indented gear-shaped section 64 in front surface 23 of base element 20, so as to allow upper element 30 to align in virtually any rotational position against base element 20 and to fit tightly against base element 20.

In certain embodiments, indented gear-shaped section 64 shown in FIG. 14 on the front surface 23 of base element 20 may have any number of slots 66, for example as few as one and as many as a multiplicity, and front surface 33 of upper element 30 may have a corresponding number of surface nodes, ribs or projections 52 in the attachment region 32 thereof positioned around receiving hole 37, for example as few as one and as many as a multiplicity, that cooperate with slots 66. Alternatively, front surface 33 of upper element 30 may have any fewer number of surface nodes, ribs or projections 52 than there are slots 66 in indented section 64, so that upper element 30 can align in virtually any rotational position against base element 20. Nodes, ribs or projections 52 that are positioned around receiving hole 37 on the front surface 33 of upper element 30 should be long enough so that they could be pressed or snapped into indented section 64 on the front surface 23 of base element 20.

Additionally, or alternatively, cooperating nodes 52 and indented section 64 may also incorporate magnets to allow for a firmer fit between them. In such an embodiment, surface nodes 52 may incorporate magnets, e.g., a magnetically attractive or ferromagnetic material, such as magnets 55, and the inside edges or other region of slots 66 may have similar magnets, such as magnets 54, that cooperate with the magnets on surface projections 52. Alternatively, magnets can be located in the center portion of attachment region 22 of base element 20 and in the center portion of attachment region 32 of upper element 30, e.g., then region that is encircled by projections 52, as described with regard to FIG. 6B.

In another version of this embodiment, rather than an indented section in the attachment region 22, front surface 23 of base element 20 may have a raised section 64 in the attachment region 22 thereof which is in the shape of a circular gear situated around receiving hole 27, as may also be seen in FIG. 14. The raised circular gear shape 64 would have a plurality of teeth 66 therearound with gaps 68 between the plurality of teeth 66. The plurality of cooperating surface nodes, ribs or projections 52 positioned around receiving hole 37 in attachment region 32 of front surface 33 of upper element 30 cooperate with gaps 68 between the teeth 66 of raised gear-shaped section in front surface 23 of base element 20, so as to allow upper element 30 to align in virtually any rotational position against base element 20 and to fit tightly against base element 20.

Alternatively, front surface 23 of base element 20 may have surface projections 52 positioned around receiving hole 37, and front surface 33 of upper element 30 may have an indented gear-shaped concave section 64 (or a convex section in the shape of a raised circular gear), that allow upper element 30 to engage with and tightly fit against base element 20.

In the embodiment shown in FIG. 14, upper element 30 of the gripping apparatus can be self-locating or self-adjusting against base element 20. When connecting member 40 draws upper element 30 towards base element 20 when the user's fingers are withdrawn, upper element 30 rests against base element 20. Magnets 54,55, if present, attract, such that surface projections 52 are drawn to and rest within slots 66 of indented gear-shaped concave section 64, or within gaps 68 of raised gear-shaped section 64, with little effort by the user, with no alignment between them being necessary due to the number of slots 66. In certain embodiments, the tolerance between surface projections 52 and their cooperating slots 66 of indented gear-shaped concave section 64, or between surface projections 52 and their cooperating gaps 68 of raised gear-shaped section 64, is small so as to allow for a tight, frictional fit. It is preferred that the tolerance between surface projections 52 and slots 66 of indented gear-shaped concave section 64, or between surface projections 52 and gaps 68 of raised gear-shaped section 64, be large enough such that the fit between them is not tight, and no downward force is needed to fit surface nodes 52 into slots 66 in base element 20 so as to engage upper element 30 with base element 20. A force applied by the user's fingers being inserted between upper element 30 and base element 20 would free surface nodes 52 from slots 66.

Figure 15:
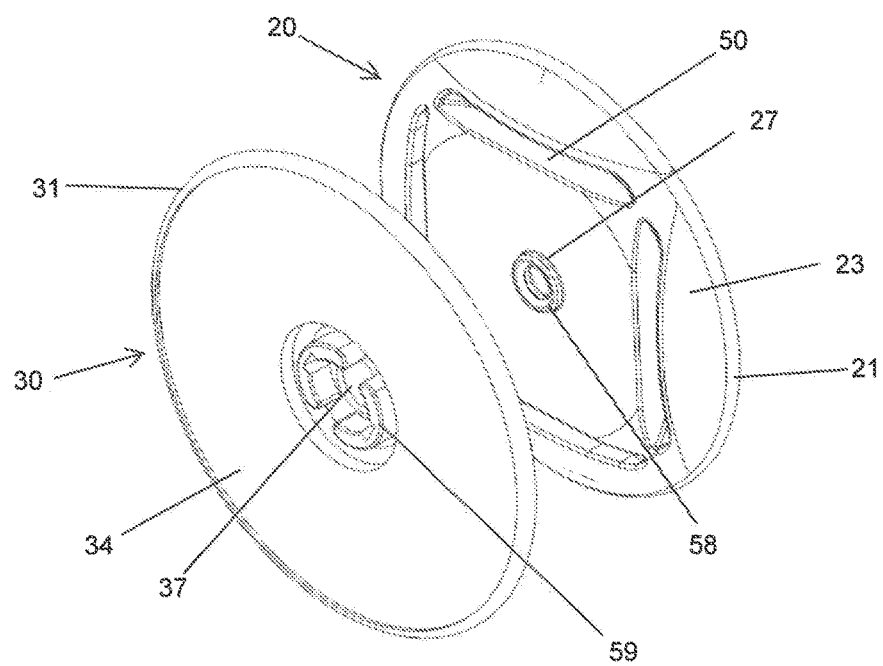
FIG. 15 schematically illustrates a perspective view of yet another configuration of the second embodiment of the gripping apparatus with the upper and base elements in a spaced apart retracted position.

Yet another example of a configuration of the gripping apparatus that allows upper element 30 and base element 20 to engage with each other without requiring the use of magnets is shown in FIG. 15, in which an annular grommet 58 is mounted in receiving hole 37 of upper element 30 such that it presses into receiving hole 27 of base element 20, or is mounted in receiving hole 27 of base element 20 such that it presses into receiving hole 37 of upper element 30, in order to help engage upper element 30 with base element 20.

As shown in FIG. 15, in certain embodiments, an annular grommet 58, which could be made of silicone, rubber or some other compressible material, is inserted into receiving hole 27 of base element 20 and mounted therein. The back side of grommet 58 is mounted into receiving hole 27 of base element 20, and the front side of grommet 58 extends forward towards upper element 30 so as to be press fit securely into receiving hole 37 of upper element 30. Connecting member 40 passes through the center hole of grommet 58 and is secured in exit recess 28 on the back side 24 of base element 20, in any effective manner, as described hereinabove with regard to FIGS. 9-11.

In order to assist in engaging upper element 30 with base element 20, the front side of grommet 58 may be squeezed or wedged into receiving hole 37 of upper element 30 between the outer rim thereof and connecting member 40 as it passes through receiving hole 37 of upper element 30. In such an embodiment, a downward force is applied to upper element 30 in order to force the front side of grommet 58 into receiving hole 37 of upper element 30 between the outer rim thereof and connecting member 40 so as to engage upper element 30 with base element 20. The compressibility of grommet 58 allows grommet 58 to have a secure fit within receiving hole 37, as secured against connecting member 40. A force applied by the user's fingers being inserted between upper element 30 and base element 20 would free grommet 58 from receiving hole 37 of upper element 30.

In some embodiments, grommet 58 may be integrally formed with base element 20, resulting in a ring-like structure attached to base element 20. In order that flexibility is generated in this ring-like structure, it may be segmented and its wall thinned. As with a separate, compressible grommet, the now segmented, thinned, ring-like structure integral to base element 20 could be squeezed into or wedged through receiving hole 37. The perimeter of receiving hole 37 would contact the segmented, ring-like structure and cause a friction fit with the ring-like structure 58.

In certain other embodiments, as shown in FIG. 15, receiving hole 37 of upper element 30 can have a grommet-receiving member 59 positioned within receiving hole 37 of upper element 30 in order to provide an even more secure fit for grommet 58 when it is squeezed or wedged between connecting member 40 and grommet-receiving member 59 within receiving hole 37. Grommet-receiving member 59 may be a compressible member, such as silicone or rubber, and may also be non-compressible, such as plastic and the like. Alternatively, grommet-receiving member 59 may be a compressible member, such as silicone or rubber, and grommet 58 may be non-compressible, such as plastic and the like.

In alternative embodiments, grommet 58 is inserted through into receiving hole 37 of upper element 30 and mounted therein and is then press fit securely into receiving hole 27 of base element 20, in the manner as described above. In certain embodiments, grommet 58 may have a larger diameter back side than front side so that grommet 58 can be mounted inside receiving hole 37 of upper element 30. In certain other embodiments, receiving hole 27 of base element 20 can have a grommet-receiving member positioned within receiving hole 27 of base element 20, in the manner described above, in order to provide a secure fit for grommet 58.

Additionally, or alternatively, as described above, magnets can be located in the center portion of attachment region 22 of base element 20 and in the center portion of attachment region 32 of upper element 30, e.g., then region that encircles grommet 58, as described with regard to FIG. 6B.

In this embodiment, connecting member 40 draws upper element 30 towards base element 20 when the user's fingers are withdrawn, upper element 30 rests against base element 20. Magnets, if present, further position upper element 30 against base element 20. When upper element 30 is against base element 20, a downward force may be applied to upper element 30 so as to press the front side of grommet 58 into receiving hole 37 in upper element 30 so as to engage upper element 30 with base element 20. A force applied by the user's fingers being inserted between upper element 30 and base element 20 would free grommet 58 from receiving hole 37 of upper element 30.

The gripping apparatus also has a feature that allows it to be used as a stand for the handheld electronic device, such that the handheld electronic device can be used in a hands-free setting. As can be seen in FIGS. 9 and 12B (as well as FIGS. 13-14), the gripping apparatus may have one or more, in some embodiments three or four, recesses 50 that are formed into front surface 23 of flange element 21 of base element 20. In certain embodiments, recesses 50 are formed into front surface 23 of flange element 21 about central mounting region 22 of base element 20. In certain embodiments, recesses 50 are elongated recesses. In preferred embodiments, as shown in FIG. 12B, recesses 50 are formed at a depth sufficient to accept insertion thereinto of an edge of flange element 31 of upper element 30.

Figure 16:
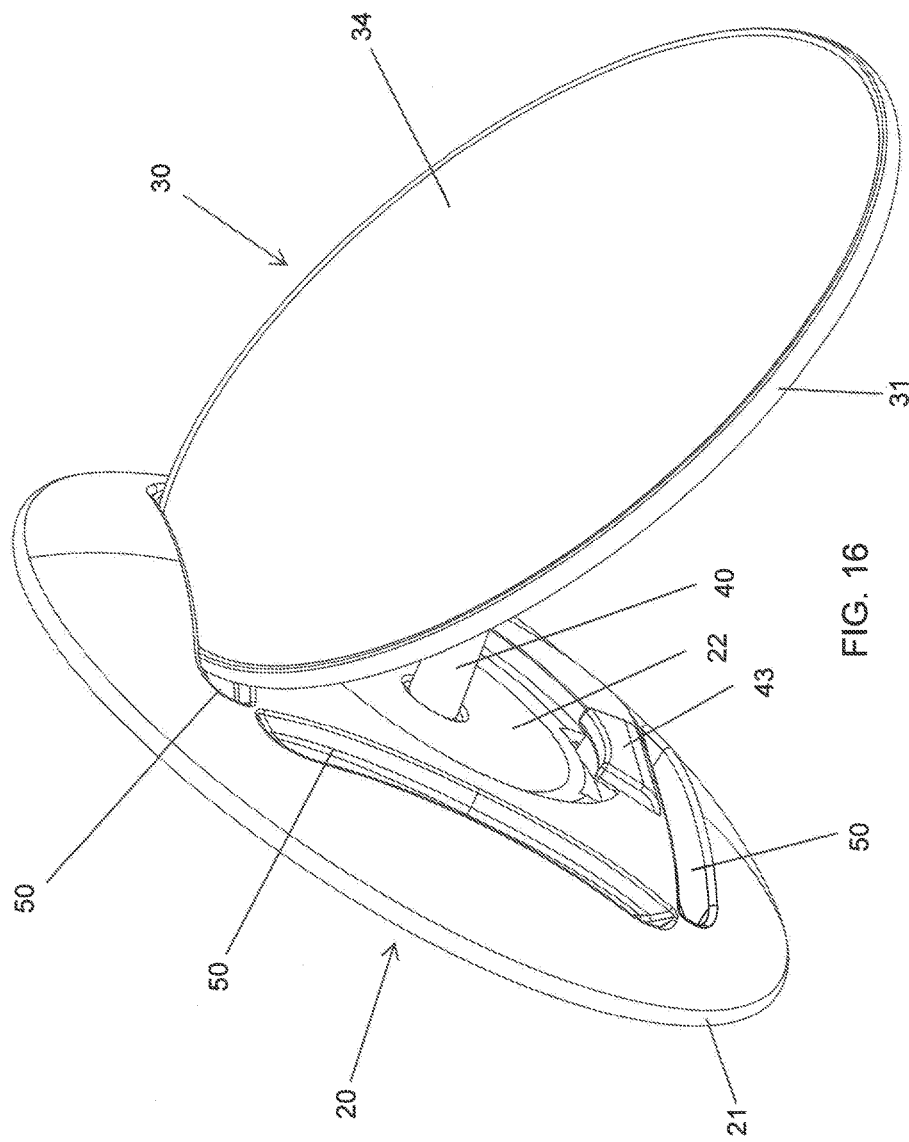
FIG. 16 schematically illustrates a perspective view of a second embodiment of the gripping apparatus with the upper and base elements in an angled configuration.

As is illustrated in FIG. 16, using recess 50, the second embodiment of the gripping apparatus may be turned into a stand for the portable or handheld electronic device to which the gripping apparatus is adhered. In these embodiments, upper element 30 may be pulled away from base element 20 such that connecting member 40 is stretched, e.g., as in FIGS. 9 and 10, and upper element 30 may then be turned at an angle relative to base element 20. From this position, as shown in FIG. 16, an edge of flange element 31 of upper element 30 may be inserted into a recess 50 that is formed into front surface 23 of flange element 21 of base element 20 that is adhered to the portable or handheld electronic device. In certain embodiments, the width of recesses 50 is only slightly larger than the thickness of flange element 31 of upper element 30, such that the fit of flange element 31 of upper element 30 into recess 50 is tight and such that the edge of flange element 31 of upper element 30 is not easily dislodged from recess 50.

As such, as shown in FIG. 16, flange element 31 of upper element 30 is mounted against flange element 21 of base element 20 at an angle relative thereto when base element 20 is adhered to the portable or handheld electronic device. Thus, in the configuration shown in FIG. 16, the gripping apparatus can be used as a stand for the portable or handheld electronic device, as shown in FIGS. 17A-D. Base element 20, along with its attached portable electronic device (the attachment of back surface 24 of flange element 21 of base element 20 to a handheld electronic device is shown in FIGS. 17A-D), and upper element 30, mounted within recess 50 of base element 20, together form an inverse V-shaped stand for the portable electronic device. As such, the portable electronic device may be used without being held by gripping apparatus.

Figure 17B:
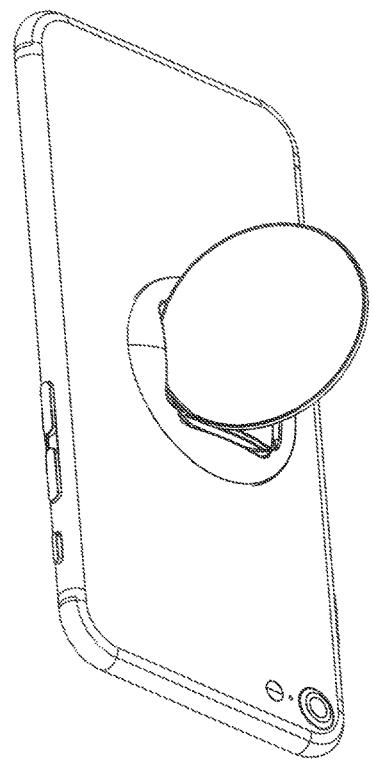
Figure 17A:
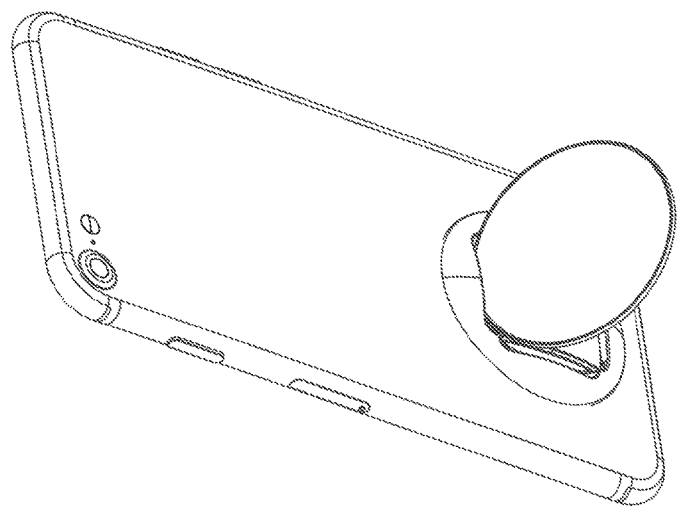

If, as in FIGS. 17A and 17B, the gripping apparatus is used as a stand so as to orient the handheld electronic device in portrait mode or a landscape mode, respectively, the stand may be modified to orient the electronic device in a desired landscape mode or portrait mode instead, simply by removing the edge of flange element 31 of upper element 30 from its recess 50, by turning upper element 30 relative to base element 20 by 90° about connecting member 40, and by inserting the edge of flange element 31 into a different recess 50 that is oriented by 90° relative to the previous recess 50, thereby allowing the gripping apparatus to form an inverse V-shaped stand for the portable electronic device.

FIGS. 17C and 17D show another way to use the gripping apparatus as a stand for the portable or handheld electronic device, different than as shown in FIGS. 17A-B. In this configuration, upper element 30 is mounted within recess 50 of base element 20, but not in the top recess, as shown in FIG. 16. Instead, the edge of flange element 31 of upper element 30 is mounted in a recess that at the bottom, namely 180° from the recess 50 that is shown in use in FIGS. 17A and 17B, so as to form an L-shaped stand for the portable electronic device. As such, the portable electronic device may be used without being held by gripping apparatus.

Similarly, if, as in FIGS. 17C and 17D, the gripping apparatus is used as a stand so as to orient the handheld electronic device in a portrait or a landscape mode, respectively, the stand may be modified to orient the electronic device in a desired landscape mode or portrait mode instead, simply by removing the edge of flange element 31 of upper element 30 from its recess 50, by turning upper element 30 relative to base element 20 by 90° about connecting member 40, and by inserting the edge of flange element 31 into a different recess 50 that is oriented by 90° relative to the previous recess 50, thereby allowing the gripping apparatus to form an L-shaped stand for the portable electronic device.

When it is desired to use the gripping apparatus to hold the portable or handheld electronic device rather than using it as a stand, as in the configuration shown in FIGS. 17A-D, the edge of flange element 31 of upper element 30 may be removed from its recess 50, and upper element 30 is allowed to be oriented substantially parallel to base element 20 and its attached electronic device. Then, at least two fingers of one hand of the user are placed between base element 20 and upper element 30 on either side of connecting member 40, as described previously.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An apparatus for assisting a user in gripping a portable electronic device, the apparatus comprising:

a base element adapted to be attached to the portable electronic device, wherein the base element has a top surface with an attachment region and a bottom surface configured to mount the base element onto the portable electronic device;

a gripping element, wherein the gripping element has a bottom surface with an attachment region; and a stretchable cord connecting the base element and the gripping element at the respective attachment regions thereof, wherein the stretchable cord is sufficiently elastic to allow the gripping element to be extended away from the base element a sufficient distance for a user to insert one or more fingers between the gripping element and the base element, to grip the user's fingers when they are inserted between the gripping element and the base element, and to snap back against the base element when the user's fingers are removed;

whereby the stretchable cord is sufficiently elastic to allow the gripping element to automatically adjust a tightness of its grip to a thickness of the user's fingers when they are inserted between the gripping element and the base element;

wherein the attachment regions of the base element and of the gripping element have respective corresponding engaging elements that cooperate with one another to permit the base element and the gripping element to be secured against or engaged with one another when the user's fingers are removed from between the gripping element and the base element.

2. The apparatus of claim 1, wherein the bottom surface of the base element has an adhesive layer thereon for securely mounting the base element to the portable electronic device.

3. The apparatus of claim 1, wherein the gripping element has a top surface and includes a cover layer that is attached to the top surface of the gripping element.

4. The apparatus of claim 1, wherein the stretchable cord is attached to the base element and the gripping element at the attachment regions thereof.

5. The apparatus of claim 1, wherein the gripping element may be at partially formed from a material that can be magnetically attracted to a car mount that is magnetized.

6. The apparatus of claim 1,
wherein the engaging elements comprise a grommet in the attachment region of one of the gripping element or the base element and an opening around the stretchable cord in the attachment region of the other of the gripping element or the base element, and
wherein the grommet may be secured within the opening by insertion of the grommet into the opening around the stretchable cord when the gripping element is placed against the base element.

7. An apparatus for assisting a user in gripping a portable electronic device, the apparatus comprising:
a base element adapted to be attached to the portable electronic device, wherein the base element has a top surface with an attachment region and a bottom surface configured to mount the base element onto the portable electronic device;
a gripping element, wherein the gripping element has a bottom surface with an attachment region; and
a stretchable cord connecting the base element and the gripping element at the respective attachment regions thereof,
wherein the attachment regions of the base element and of the gripping element have respective corresponding engaging elements that cooperate with one another to permit the base element and the gripping element to be secured against or engaged with one another when the user's fingers are removed from between the gripping element and the base element, and
wherein the attachment regions of the base element and of the gripping element have respective corresponding contours that cooperate with one another to permit the gripping element to be angled relative to the base element so that the user's fingers may be inserted between the gripping element and the base element.

8. The apparatus of claim 7,
wherein the attachment region of the base element has a concave shape and the attachment region of the gripping element has a convex shape,
whereby, by cooperation of the respective attachment regions, the gripping element is configured to be fit into the base element and is configured to be angled relative to the base element when the gripping element is pushed down or lifted upwards at an edge thereof.

9. The apparatus of claim 7,
wherein the attachment region of the base element has a convex shape and the attachment region of the gripping element has a concave shape,
whereby, by cooperation of the respective attachment regions, the gripping element is configured to be fit onto the base element and is configured to be angled relative to the base element when the gripping element is pushed down or lifted upwards at one edge thereof.

10. An apparatus for assisting a user in gripping a portable electronic device, the apparatus comprising:
a base element adapted to be attached to the portable electronic device, wherein the base element has a top surface with an attachment region and a bottom surface configured to mount the base element onto the portable electronic device;
a gripping element, wherein the gripping element has a bottom surface with an attachment region; and
a stretchable cord connecting the base element and the gripping element at the respective attachment regions thereof,
wherein the attachment regions of the base element and of the gripping element have respective corresponding engaging elements that cooperate with one another to permit the base element and the gripping element to be secured against or engaged with one another when the user's fingers are removed from between the gripping element and the base element,
wherein the engaging elements comprise a first magnetic element on the attachment region of the gripping element and a second magnetic element on the attachment region of the base element, and
wherein the gripping element may be secured against or engaged with the base element by cooperation of the first and second magnetic elements when the gripping element is placed against the base element.

11. An apparatus for assisting a user in gripping a portable electronic device, the apparatus comprising:
a base element adapted to be attached to the portable electronic device, wherein the base element has a top surface with an attachment region and a bottom surface configured to mount the base element onto the portable electronic device;
a gripping element, wherein the gripping element has a bottom surface with an attachment region; and
a stretchable cord connecting the base element and the gripping element at the respective attachment regions thereof,
wherein the attachment regions of the base element and of the gripping element have respective corresponding engaging elements that cooperate with one another to permit the base element and the gripping element to be secured against or engaged with one another when the user's fingers are removed from between the gripping element and the base element,
wherein the engaging elements comprise one or more protrusions on the attachment region of one of the gripping element or the base element and one or more indentations on the attachment region of the other of the gripping element or the base element, and
wherein the gripping element may be secured against or engaged with the base element by insertion of the one or more protrusions into the one or more indentations when the gripping element is placed against the base element.

12. The apparatus of claim 11, wherein the one or more protrusions fit tightly into the one or more indentations.

13. An apparatus for assisting a user in gripping a portable electronic device, the apparatus comprising:
a base element adapted to be attached to the portable electronic device, wherein the base element has a top surface with an attachment region and a bottom surface configured to mount the base element onto the portable electronic device;

a gripping element, wherein the gripping element has a bottom surface with an attachment region; and a stretchable cord connecting the base element and the gripping element at the respective attachment regions thereof, wherein the attachment regions of the base element and of the gripping element have respective corresponding engaging elements that cooperate with one another to permit the base element and the gripping element to be secured against or engaged with one another when the user's fingers are removed from between the gripping element and the base element, wherein the engaging elements comprise a raised or an indented circular gear-shaped section on the attachment region of one of the gripping element or the base element and a plurality of projections on the attachment region of the other of the gripping element or the base element, wherein, if the circular gear-shaped section is raised, the circular gear-shaped section has a plurality of circumferential teeth therearound with a gap between each two of the plurality of teeth, and wherein each of the plurality of projections is shaped to fit within a gap;

wherein, if the circular gear-shaped section is indented, the circular gear-shaped section has a plurality of circumferential tooth slots therearound with a peak between each two of the plurality of tooth slots, and wherein each of the plurality of projections is shaped to fit within a tooth slot; and wherein the gripping element may be secured against or engaged with the base element by insertion of the one or more projections into one or more respective gaps or one or more respective tooth slots when the gripping element is placed against the base element.

14. The apparatus of claim 13, wherein the one or more projections fit tightly into the one or more respective gaps or into the one or more respective tooth slots.

15. The apparatus of claim 13, wherein the gripping element may be secured against or engaged with the base element in any rotational position relative thereto.

16. An apparatus for assisting a user in gripping a portable electronic device, the apparatus comprising:

a base element adapted to be attached to the portable electronic device, wherein the base element has a top surface with an attachment region and a bottom surface configured to mount the base element onto the portable electronic device;

a gripping element, wherein the gripping element has a bottom surface with an attachment region; and a stretchable cord connecting the base element and the gripping element at the respective attachment regions thereof, wherein the attachment regions of the base element and of the gripping element have respective corresponding engaging elements that cooperate with one another to permit the base element and the gripping element to be secured against or engaged with one another when the user's fingers are removed from between the gripping element and the base element, wherein the engaging elements comprise one or more arcuate slots on the attachment region of one of the gripping element or the base element and one or more projections on the attachment region of the other of the gripping element or the base element, and wherein the gripping element may be secured against or engaged with the base element by insertion of the one or more projections into the one or more arcuate slots and by subsequent rotation of the gripping element relative to the base element.

17. The apparatus of claim 16, wherein at least one of the one or more arcuate slots has a bump or lip at a position therein such that at least one of the one or more projections passes thereover after insertion of the one or more projections into the one or more arcuate slots and subsequent rotation of the gripping element relative to the base element, such that, during rotation of the gripping element relative to the base element, a user securing the gripping element against or engaging it with the base element feels that the gripping element has been secured against or engaged with the base element.

18. An apparatus for assisting a user in gripping a portable electronic device, the apparatus comprising:

a base element adapted to be attached to the portable electronic device, wherein the base element has a top surface with an attachment region and a bottom surface configured to mount the base element onto the portable electronic device;

a gripping element, wherein the gripping element has a bottom surface with an attachment region; and a stretchable cord connecting the base element and the gripping element at the respective attachment regions thereof, wherein the attachment regions of the base element and of the gripping element have respective corresponding engaging elements that cooperate with one another to permit the base element and the gripping element to be secured against or engaged with one another when the user's fingers are removed from between the gripping element and the base element, wherein the gripping element has a planar shape with at least one edge, and wherein the top surface of the base element comprises at least one recess that is configured to accept the edge of the gripping element, such that the gripping element may be mounted at an angle against the base element.

19. The apparatus of claim 18, wherein the apparatus may be formed into a stand for the portable electronic device by insertion of the edge of the gripping element into one of the at least one recess such that the gripping element is mounted at an angle against the base element, thereby forming a stand.

20. The apparatus of claim 18, wherein the top surface of the base element comprises at least two recesses located at different positions thereon, so as to provide at least two different types of stands for the portable electronic device when the gripping element is mounted at an angle against the base element.

21. An apparatus for assisting a user in gripping a portable electronic device, the apparatus comprising:

a base element, wherein the base element has a planar body having a top surface with an attachment region that has a first contour in at least a portion thereof and having a bottom surface configured to attach the base element onto the portable electronic device, the base element having one or more first engaging elements;

a gripping element, wherein the gripping element has a bottom surface with an attachment region that has a second contour in at least a portion thereof, the gripping element having one or more second engaging elements; and a stretchable cord connecting the base element and the gripping element at the respective attachment regions thereof that is sufficiently elastic to allow the gripping element to be extended away from the base element a sufficient distance for a user to insert one or more fingers between the gripping element and the base element, whereby the stretchable cord grips the user's fingers when they are inserted between the gripping element and the base element and snaps the gripping element back against the base element when the user's fingers are removed, and whereby the stretchable cord allows the gripping element to automatically adjust a tightness of its grip to a thickness of the user's fingers when they are inserted between the gripping element and the base element;

wherein the first contour of the attachment region of the gripping element is configured to cooperate with the second contour of the attachment region of the base element when the stretchable cord pulls the gripping element against of the base element, thereby allowing the gripping element to be angled relative to the base element when the gripping element is pushed down or lifted upwards at an edge thereof so that the user's fingers may be inserted between the gripping element and the base element, and wherein the one or more first engaging elements and the one or more second engaging elements cooperate to permit the base element and the gripping element to be engaged with each other.

22. The apparatus of claim 21, wherein the one or more first engaging elements comprises at least one first magnetic element and the one or more second engaging elements comprises at least one second magnetic element that cooperates with the at least one first magnetic element, and wherein the gripping element may be engaged with the base element by cooperation of the at least one first magnetic element and the at least one second magnetic element when the gripping element is placed against the base element.

23. The apparatus of claim 21, wherein one of the one or more first engaging elements or of the one or more second engaging elements comprises at least one arcuate slot and the other of the one or more first engaging elements or of the one or more second engaging elements comprises at least one projection that cooperates with the at least one arcuate slot, whereby the gripping element may be engaged with the base element by insertion of the at least one projection into the at least one arcuate slot and by subsequent rotation of the gripping element relative to the base element.

24. The apparatus of claim 23, wherein the at least one arcuate slot has a bump or lip at a position therein such that the at least one projection passes thereover after insertion of the at least one projection into the at least one arcuate slot and subsequent rotation of the gripping element relative to the base element, such that, during rotation of the gripping element relative to the base element, a user securing the gripping element against or engaging it with the base element feels that the gripping element has been secured against or engaged with the base element.

25. The apparatus of claim 21, wherein one of the one or more first engaging elements or of the one or more second engaging elements comprises at least one protrusion and the other of the one or more first engaging elements or of the one or more second engaging elements comprises at least one indentation that cooperates with the at least one protrusion, wherein the gripping element may be secured against or engaged with the base element by insertion of the at least one protrusion into the at least one indentation when the gripping element is placed against the base element.

26. The apparatus of claim 25, wherein the at least one protrusion fits tightly into the at least one indentation.

27. The apparatus of claim 21, wherein one of the one or more first engaging elements or of the one or more second engaging elements comprises a raised or an indented circular gear-shaped section and the other of the one or more first engaging elements or of the one or more second engaging elements comprises at least one projection, wherein, if the circular gear-shaped section is raised, the circular gear-shaped section has a plurality of circumferential teeth therearound with a gap between each two of the plurality of teeth, and wherein each of the at least one projection is shaped to fit within a gap;

wherein, if the circular gear-shaped section is indented, the circular gear-shaped section has a plurality of circumferential tooth slots therearound with a peak between each two of the plurality of tooth slots, and wherein each of the at least one projection is shaped to fit within a tooth slot; and wherein the gripping element may be secured against or engaged with the base element by insertion of the at least one projection into at least one respective gap or at least one respective tooth slot when the gripping element is placed against the base element.

28. The apparatus of claim 21, wherein one of the one or more first engaging elements or of the one or more second engaging elements comprises a grommet in the attachment region and the other of the one or more first engaging elements or of the one or more second engaging elements comprises an opening around the stretchable cord in the attachment region, wherein the grommet may be secured within the opening by insertion of the grommet into the opening around the stretchable cord when the gripping element is placed against the base element.

29. The apparatus of claim 21, wherein the gripping element has a planar shape, and wherein the top surface of the base element comprises at least one recess that is configured to accept the edge of the gripping element, such that the gripping element may be mounted at an angle against the base element.

30. The apparatus of claim 29, wherein the apparatus may be formed into a stand for the portable electronic device by insertion of the edge of the gripping element into one of the at least one recess of the base element, such that the gripping element is mounted at an angle against the base element, thereby forming a stand.

* * * * *

UNITED STATES PATENT AND TRADEMARK OFFICE
CERTIFICATE OF CORRECTION

| | | |
|---|---|---|
| PATENT NO. | : 10,244,854 B1 | Page 1 of 3 |
| APPLICATION NO. | : 15/958746 | |
| DATED | : April 2, 2019 | |
| INVENTOR(S) | : Shimon Haber et al. | |

It is certified that error appears in the above-identified patent and that said Letters Patent is hereby corrected as shown below:

In the Specification

Beginning at Column 5 Line 60-Column 6 Line 30 Please amend the paragraph as follows:
-- In another embodiment, an apparatus for assisting a user in gripping a portable electronic device comprises a base element, wherein the base element has a planar body having a top surface with an attachment region that has a first contour in at least a portion thereof and having a bottom surface configured to attach the base element onto the portable electronic device, the base element having one or more first engaging elements; a gripping element, wherein the gripping element has a bottom surface with an attachment region that has a second contour in at least a portion thereof, the gripping element having one or more second engaging elements; and a stretchable cord connecting the base element and the gripping element at the respective attachment regions thereof that is sufficiently elastic to allow the gripping element to be extended away from the base element a sufficient distance for a user to insert one or more fingers between the gripping element and the base element, whereby the stretchable cord grips the user's fingers when they are inserted between the gripping element and the base element and snaps the gripping element back against the base element when the user's fingers are removed, and whereby the stretchable cord allows the gripping element to automatically adjust a tightness of its grip to a thickness of the user's fingers when they are inserted between the gripping element and the base element; wherein the second contour of the attachment region of the gripping element is configured to cooperate with the first contour of the attachment region of the base element when the stretchable cord pulls the gripping element against of the base element, thereby allowing the gripping element to be angled relative to the base element when the gripping element is pushed down or lifted upwards at an edge thereof so that the user's fingers may be inserted between the gripping element and the base element, and wherein the one or more first engaging elements and the one or more second engaging elements cooperate to permit the base element and the gripping element to be engaged with each other. --

Signed and Sealed this
Eighth Day of September, 2020

Andrei Iancu
*Director of the United States Patent and Trademark Office*

CERTIFICATE OF CORRECTION (continued)
U.S. Pat. No. 10,244,854 B1

In the Claims

Column 26 Line 61-Column 27 Lines 1-34 Please amend Claim 13 as follows:
13. An apparatus for assisting a user in gripping a portable electronic device, the apparatus comprising:
> a base element adapted to be attached to the portable electronic device, wherein the base element has a top surface with an attachment region and a bottom surface configured to mount the base element onto the portable electronic device;
> a gripping element, wherein the gripping element has a bottom surface with an attachment region; and
> a stretchable cord connecting the base element and the gripping element at the respective attachment regions thereof,
> wherein the attachment regions of the base element and of the gripping element have respective corresponding engaging elements that cooperate with one another to permit the base element and the gripping element to be secured against or engaged with one another when the user's fingers are removed from between the gripping element and the base element,
> wherein the engaging elements comprise a raised or an indented circular gear-shaped section on the attachment region of one of the gripping element or the base element and a plurality of projections on the attachment region of the other of the gripping element or the base element,
> wherein, if the circular gear-shaped section is raised, the circular gear-shaped section has a plurality of circumferential teeth therearound with a gap between each two of the plurality of teeth, and wherein each of the plurality of projections is shaped to fit within a gap;
> wherein, if the circular gear-shaped section is indented, the circular gear-shaped section has a plurality of circumferential tooth slots therearound with a peak between each two of the plurality of tooth slots, and wherein each of the plurality of projections is shaped to fit within a tooth slot; and
> wherein the gripping element may be secured against or engaged with the base element by insertion of one or more projections into one or more respective gaps or one or more respective tooth slots when the gripping element is placed against the base element.

Column 28 Lines 52-Column 29 Lines 1-28 Please amend Claim 21 as follows:
21. An apparatus for assisting a user in gripping a portable electronic device, the apparatus comprising:
> a base element, wherein the base element has a planar body having a top surface with an attachment region that has a first contour in at least a portion thereof and having a bottom surface configured to attach the base element onto the portable electronic device, the base element having one or more first engaging elements;
> a gripping element, wherein the gripping element has a bottom surface with an attachment region that has a second contour in at least a portion thereof, the gripping element having one or more second engaging elements; and
> a stretchable cord connecting the base element and the gripping element at the respective attachment regions thereof that is sufficiently elastic to allow the gripping element to be extended away from the base element a sufficient distance for a user to insert one or more fingers between the gripping element and the base element,
> whereby the stretchable cord grips the user's fingers when they are inserted between the

CERTIFICATE OF CORRECTION (continued)
U.S. Pat. No. 10,244,854 B1 gripping element and the base element and snaps the gripping element back against the base element when the user's fingers are removed, and whereby the stretchable cord allows the gripping element to automatically adjust a tightness of its grip to a thickness of the user's fingers when they are inserted between the gripping element and the base element;

wherein the second contour of the attachment region of the gripping element is configured to cooperate with the first contour of the attachment region of the base element when the stretchable cord pulls the gripping element against of the base element, thereby allowing the gripping element to be angled relative to the base element when the gripping element is pushed down or lifted upwards at an edge thereof so that the user's fingers may be inserted between the gripping element and the base element, and wherein the one or more first engaging elements and the one or more second engaging elements cooperate to permit the base element and the gripping element to be engaged with each other.